(12) United States Patent
Sato et al.

(10) Patent No.: US 6,250,414 B1
(45) Date of Patent: Jun. 26, 2001

(54) WORKING VEHICLE

(75) Inventors: Kenichi Sato, Osaka; Yasunobu Nakatani, Sakai; Hiroshi Miyake, Sakai; Keishiro Nishi, Sakai; Akiyoshi Ono, Izumi; Motonobu Nishii, Sakai; Yoichi Sugihara, Sakai; Shota Nagasawa, Sakai; Kiyoshi Hanamoto, Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/123,653

(22) Filed: Jul. 28, 1998

(30) Foreign Application Priority Data

Sep. 18, 1997 (JP) .................................................. 9-252980
Sep. 18, 1997 (JP) .................................................. 9-252981
Sep. 18, 1997 (JP) .................................................. 9-252982

(51) Int. Cl.$^7$ .................................................. B60K 17/10
(52) U.S. Cl. ........................................ 180/307; 180/53.62
(58) Field of Search ............................... 180/53.1, 53.62, 180/305, 307, 291, 292, 337, 364; 74/15.63, 481, 560

(56) References Cited

U.S. PATENT DOCUMENTS

| 2,140,687 | * | 12/1938 | Brown ................................. 74/15.63 |
| 3,196,696 | * | 7/1965 | Ritter ................................. 74/15.63 |
| 3,448,635 | * | 6/1969 | Eggers et al. ........................... 74/560 |
| 3,511,105 | * | 5/1970 | Matter ................................. 74/481 |
| 3,898,891 | | 8/1975 | Colloton ............................... 74/474 |
| 4,040,306 | * | 8/1977 | Jensen ................................. 74/481 |
| 4,145,883 | * | 3/1979 | Forster ................................. 180/305 |
| 4,262,768 | | 4/1981 | Itatani ................................. 180/242 |
| 4,341,129 | * | 7/1982 | Bando .................................. 74/481 |
| 4,402,181 | * | 9/1983 | Acker et al. ........................... 180/307 |
| 4,528,867 | | 7/1985 | Semba ................................. 74/606 |
| 4,977,760 | | 12/1990 | Ishimori ............................... 60/444 |
| 5,233,880 | * | 8/1993 | Sato et al. ............................. 74/481 |
| 5,526,892 | | 6/1996 | Matsuda ............................... 180/53.1 |
| 5,542,307 | * | 8/1996 | Hasegawa et al. ...................... 74/15.63 |
| 5,570,605 | * | 11/1996 | Kitagawara et al. ..................... 74/15.63 |

FOREIGN PATENT DOCUMENTS

| 1266976 | * | 6/1961 | (FR) ................................. 180/307 |
| 1348283 | * | 11/1963 | (FR) ................................. 180/307 |
| 1104550 | * | 2/1968 | (GB) ................................. 180/307 |
| 6132653 | | 2/1986 | (JP) . |
| 6416436 | | 1/1989 | (JP) ................................. B60K/31/00 |
| 7032897 | | 2/1995 | (JP) ................................. B60K/20/00 |
| 7329587 | | 12/1995 | (JP) ................................. B60K/17/10 |

* cited by examiner

Primary Examiner—Frank Vanaman
(74) Attorney, Agent, or Firm—Webb Ziesenheim Logsdon Orkin & Hanson, P.C.

(57) ABSTRACT

To provide a working vehicle with a simple body structure, an HST case containing a hydraulic stepless transmission is disposed between an engine adjacent one end in a fore and aft direction of a vehicle body, and a propelling transmission case disposed adjacent the other end in the fore and aft direction. The HST case, with the engine and propelling transmission case, forms the vehicle body. With this construction, a driving deck is located at a relatively low level so that the driver may board and alight from the deck with ease. Despite the low level of the deck, the bottom of the vehicle body is at a relatively high level to be free from contact with projections on unleveled terrain. Frame strength may be increased where the HST case is connected between a main clutch housing connected to the rear of the engine and the propelling transmission case.

13 Claims, 18 Drawing Sheets

FIG. 16
(a)
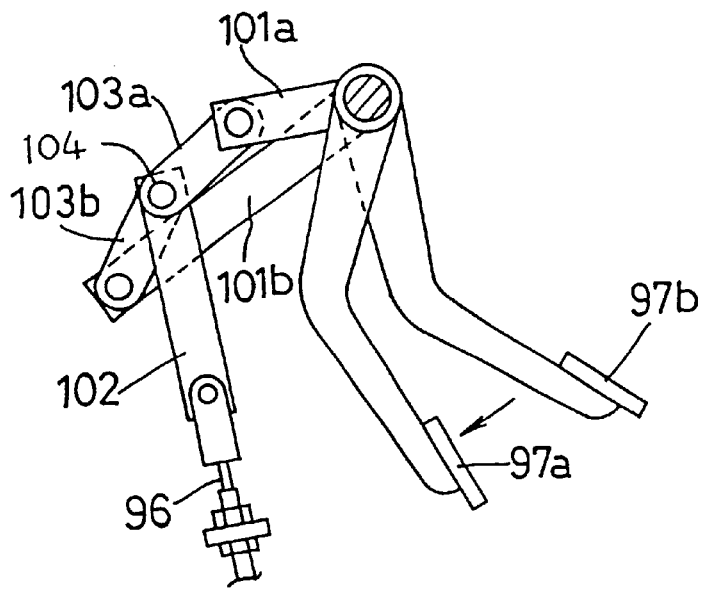
(b)
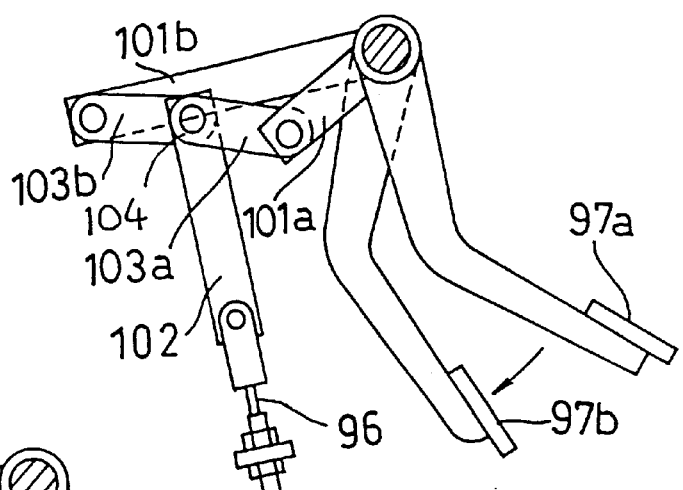
(c)
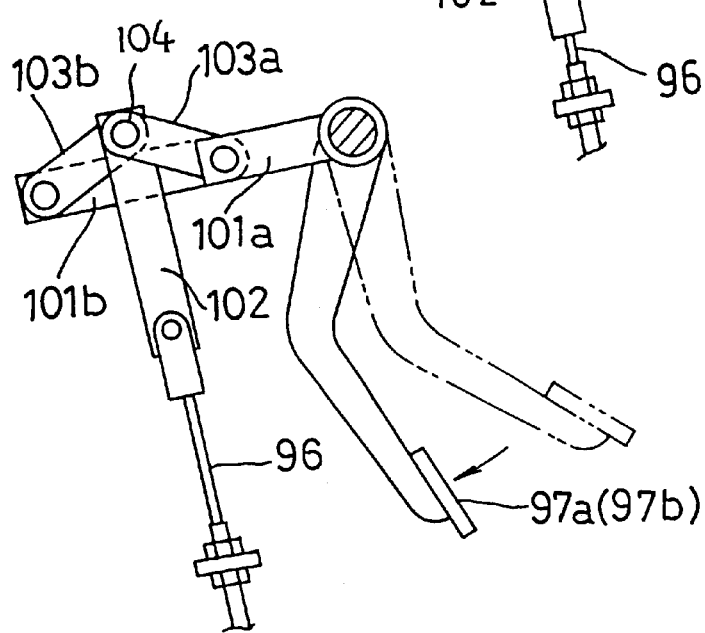

WORKING VEHICLE

BACKGROUND OF THE INVENTION

1. Field of the Invention

This invention relates to a working vehicle having an engine disposed in a forward position of a vehicle body, and a propelling transmission disposed in a rearward position of the vehicle body for receiving engine output transmitted through a hydraulic stepless transmission.

2. Description of the Related Art

As an example of conventional working vehicles as noted above, an agricultural tractor is disclosed in Japanese Patent Laying-Open Publication H7-329587. This tractor has a body frame formed of an engine, a front transmission integrated with the rear of the engine, a transmission frame coupled at a forward end thereof to the front transmission, and a rear transmission coupled to the rear end of the transmission frame. A hydraulic stepless transmission is mounted in the transmission frame for changing speed of engine output and transmitting it to the rear transmission.

The above prior art vehicle has a complicated construction since the body frame and transmissions must be formed separately. This vehicle has a further disadvantage that an upper portion of the vehicle body is at a high level above the ground while the bottom of the vehicle body is at a low level above the ground.

Other conventional examples of working vehicles are disclosed in U.S. patent Ser. No. 4,997,760 and Japanese Patent Laying-Open Publication S64-16436. In these working vehicles, a stepless transmission is operable by a change speed pedal. The driver may operate the stepless transmission easily with a foot to control the running speed of the vehicle. In these working vehicles, the change speed pedal and a control part of the transmission are relatively remote from each other longitudinally of the vehicle body. Thus, where the change speed pedal and transmission are connected to each other through an interlocking mechanism (pivotal links and rods, etc.), friction and flexibility of connecting parts in the interlocking mechanism result in increased operational resistance and play, which impair response and tend to worsen operability of the vehicle. Besides, the change speed pedal is located at a low level for the level at which the transmission is disposed, and is low relative to the driver's seat. Consequently, when the driver depresses the change speed pedal, an excessive force acts on the driver's foot at a relatively early stage of operation. This results in inconveniences of a reduced shifting range and the like which tend to worsen operability.

As a further example of conventional working vehicles, a tractor is disclosed in Japanese Patent Laying-Open Publication H7-32897. In this tractor, a change speed pedal is supported by a support bracket fixed to a body frame. The change speed pedal is coupled to a trunnion (control part) of a stepless transmission through a link and so on. Running speed may be changed by controlling the stepless transmission with the change speed pedal. In many tractors, the driving deck is supported by the body frame through rubber cushions. In the tractors having a change speed pedal supported by the body frame as in this conventional tractor, the driver's foot attempting to operate the change speed pedal may inadvertently deviate therefrom when a relative displacement due to running vibration or the like occurs between the driving deck above the rubber cushions and the body frame below the rubber cushions.

SUMMARY OF THE INVENTION

An object of this invention is to provide a working vehicle having a simple construction regarding a body frame and transmissions while enabling easy shifting operations.

Another object of this invention is to provide a working vehicle having a change speed pedal of excellent operability for effecting change speed operations.

A further object of this invention is to provide a relatively simple speed control structure for allowing a stepless transmission to be controllable by a change speed pedal with excellent operability even for a working vehicle having a driving deck supported by a body frame through rubber cushions or the like.

The above objects are fulfilled, according to this invention, by a working vehicle comprising:

an engine disposed adjacent one end in a fore and aft direction of a vehicle body;

a propelling transmission case disposed adjacent the other end in the fore and aft direction of the vehicle body; and an HST case disposed between the engine and the propelling transmission case;

the HST case housing a hydraulic stepless transmission having a hydraulic pump and a hydraulic motor for changing speed of engine output and transmitting the engine output to the propelling transmission in the propelling transmission case;

the HST case defining an oil chamber accommodating the hydraulic pump and the hydraulic motor;

wherein the engine, the propelling transmission case and the HST case constitute a body frame.

According to the above construction, the stepless transmission case is disposed between the engine and the propelling transmission case to form the body frame in combination with the engine and the propelling transmission case. The body frame has a simplified construction with the stepless transmission case used for forming the body frame. Moreover, a driving deck is located at a relatively low level so that the driver may board and alight from the deck with ease. Despite the low level of the deck, the bottom of the vehicle body is at a relatively high level to be free from contact with projections on unleveled terrain. Thus, the vehicle has an improved running performance.

The above working vehicle may further comprise a main clutch housing connected to the rear of the engine, wherein the HST case is connected between the main clutch housing and the propelling transmission case to increase frame strength.

To position the upper surface of the HST case in a reduced level and the bottom thereof in an elevated level, the hydraulic pump and the hydraulic motor may be arranged in the HST case transversely instead of vertically of the vehicle body, or a control device (a servo cylinder and a servo valve) for varying a swash plate angle of the hydraulic pump may be disposed on a side surface of the HST case.

Further, the hydraulic pump may advantageously have an intake port and a drain port arranged in a direction relative to the vehicle body different from a direction of arrangement of an intake port and a drain port of the hydraulic motor. For example, the ports of one may be arranged vertically while the ports of the other are arranged transversely of the vehicle body. Then, an oil line between the intake port of the hydraulic pump and the drain port of the hydraulic motor, and an oil line between the drain port of the hydraulic pump and the intake port of the hydraulic motor, may include minimum bends or bypasses to avoid a complicated layout. The two oil lines have a short and simple configuration.

In a preferred embodiment of the invention, the hydraulic stepless transmission is disposed adjacent and rearwardly of the main clutch, the hydraulic stepless transmission being operable by a change speed pedal disposed in a position above the hydraulic stepless transmission and where the hydraulic stepless transmission and the change speed pedal overlap each other in plan view.

Generally, the change speed pedal, if disposed adjacent the main clutch, is in an appropriate positional relationship with a driver's seat, to be easily operable without applying an excessive force to the driver's foot and through an increased depressing stroke. Where the hydraulic stepless transmission is disposed adjacent and rearwardly of the main clutch, the change speed pedal may also be disposed adjacent the main clutch. Besides, where the change speed pedal is operatively connected to the hydraulic stepless transmission through an interlocking mechanism, the interlocking mechanism may be small and light and free from excessive operational resistance and play at connections. This facilitates a control operation using the change speed pedal, and assures an improved response to the control operation.

According to this invention, a power branching mechanism may be disposed between the main clutch and the hydraulic stepless transmission for dividing power from the engine to an input of the hydrostatic stepless transmission and to an implement driving transmission disposed in a rearward portion of the vehicle body. With this power branching mechanism, the implement driving transmission receives the power without speed variation when the stepless transmission changes running speed. Moreover, since the power branching mechanism is disposed between the main clutch and the hydraulic stepless transmission, the implement driving transmission receives the power without speed variation despite variations in running speed while the weight of the power branching mechanism is offset forwardly of the vehicle body. Thus, when a working implement is connected to the rear of the vehicle body, the weight of the power branching mechanism is used so that a reduced number of balancing weights is required to secure a front and rear weight balance. This results in a reduced weight of the working vehicle.

In a preferred embodiment of the invention, the change speed pedal is pivotably supported on the driving deck. With this construction, the change speed pedal moves with the driving deck relative to the body frame when running vibrations occur with a tractor in which the driving deck is supported on the body frame through rubber cushions. Even when a relative displacement occurs between the driving deck and body frame, a relative displacement hardly occurs between the pedal and deck. Consequently, pedal action is stabilized.

Where the change speed pedal is operatively connected to the control device of the stepless transmission through the interlocking mechanism, a relative displacement between the driving deck and body frame is absorbed by movement of pivotal links and the like forming the interlocking mechanism. Thus, an inadvertent change speed operation is unlikely to be caused for the transmission. Where a neutral restoring device of relatively simple structure such as a spring is provided for both of the change speed pedal and stepless transmission, the change speed pedal and transmission smoothly return to neutral positions when the change speed pedal is released from a depressed position. Thus, a relatively inexpensive speed control structure is obtained which responds to a pedal operation with high precision, neither excessively nor insufficiently.

Other features, functions, effects and advantages of the present invention will be appreciated upon reading the following description with reference to the drawings.

BRIEF DESCRIPTION OF THE DRAWING

FIG. 16 is an explanatory view of operation of an interlock regulating mechanism;

DESCRIPTION OF THE PREFERRED EMBODIMENTS

A preferred embodiment of this invention will be described hereinafter. In the following embodiment, the invention is applied to an agricultural tractor which is one example of working vehicles.

Figure 1:
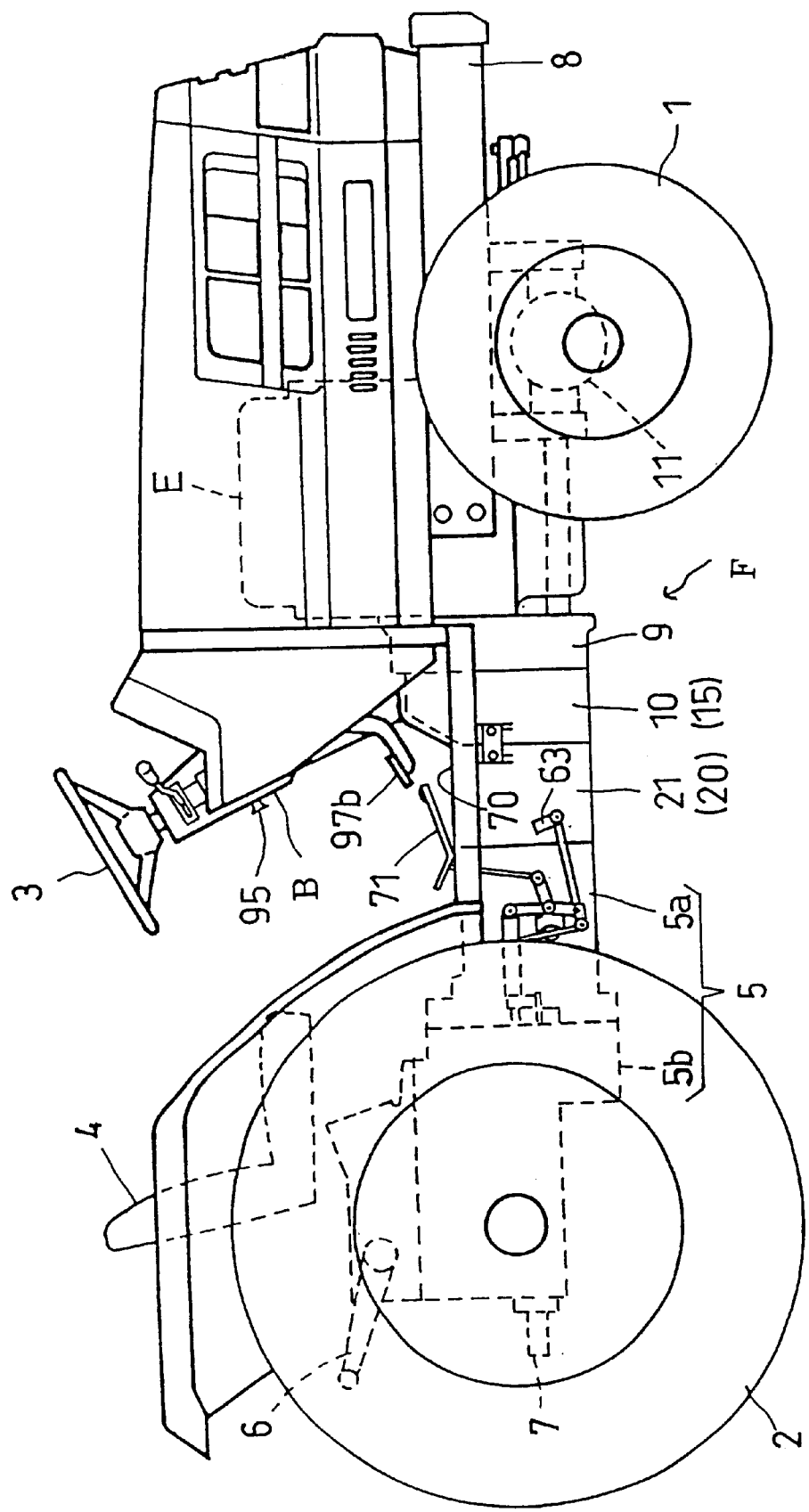
FIG. 1 is a side elevation of an agricultural tractor shown as one example of working vehicles according to this invention.

The agricultural tractor shown in FIG. 1 includes right and left front drive wheels 1 and right and left rear drive wheels 2, a motor section having an engine E disposed in a front position of a vehicle body, and a driver's section having a steering wheel 3 for steering the front wheels 1 and a driver's seat 4. In a rearward portion of the vehicle body are a transmission case 5, lift arms 6 for raising and lowering a varied working implement coupled to the vehicle body, and a PTO shaft 7 for transmitting power to the working implement coupled to the vehicle body. For instance, the working implement may be a plow so that the tractor acts as a riding type cultivator.

Figure 2:
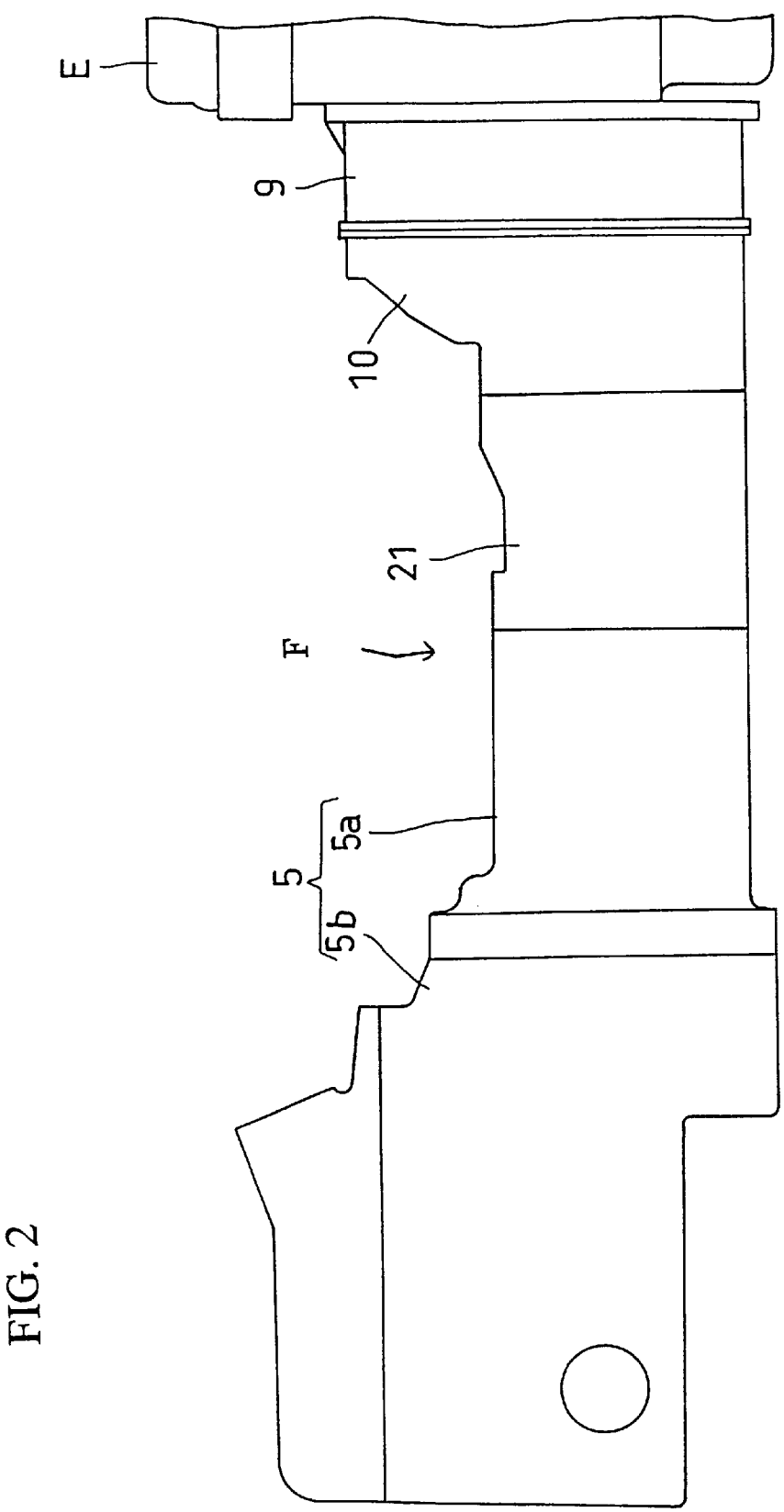
FIG. 2 is a side view of a body frame.

As shown in FIGS. 1 and 2, a body frame F of this tractor includes the engine E, front frames 8 extending forward from opposite lower side positions of engine E, a flywheel housing 9 disposed rearwardly of engine E, a main clutch housing 10 bolted to the rear end of flywheel housing 9, an HST case 21 having a forward end thereof coupled to the rear end of main clutch housing 10, and the transmission case 5 having a forward end thereof coupled to the rear end of HST case 21.

The transmission case 5 includes a main transmission case body 5a having a forward end thereof coupled to HST case 21, and a differential case portion 5b having a forward end thereof bolted to the rear end of main transmission case body 5a.

Figure 3:
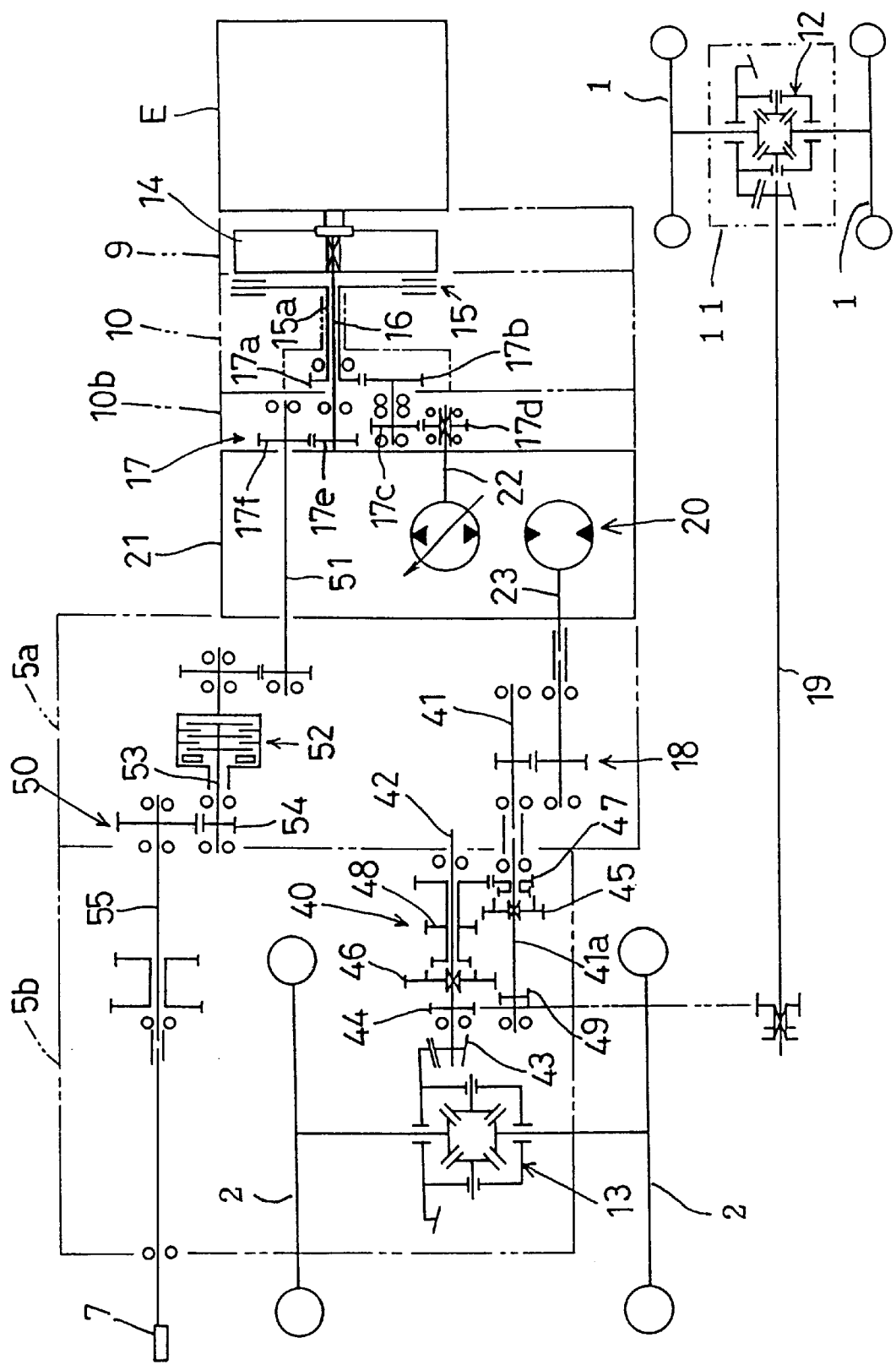
FIG. 3 is a schematic view of an engine power transmission system.
Figure 4:
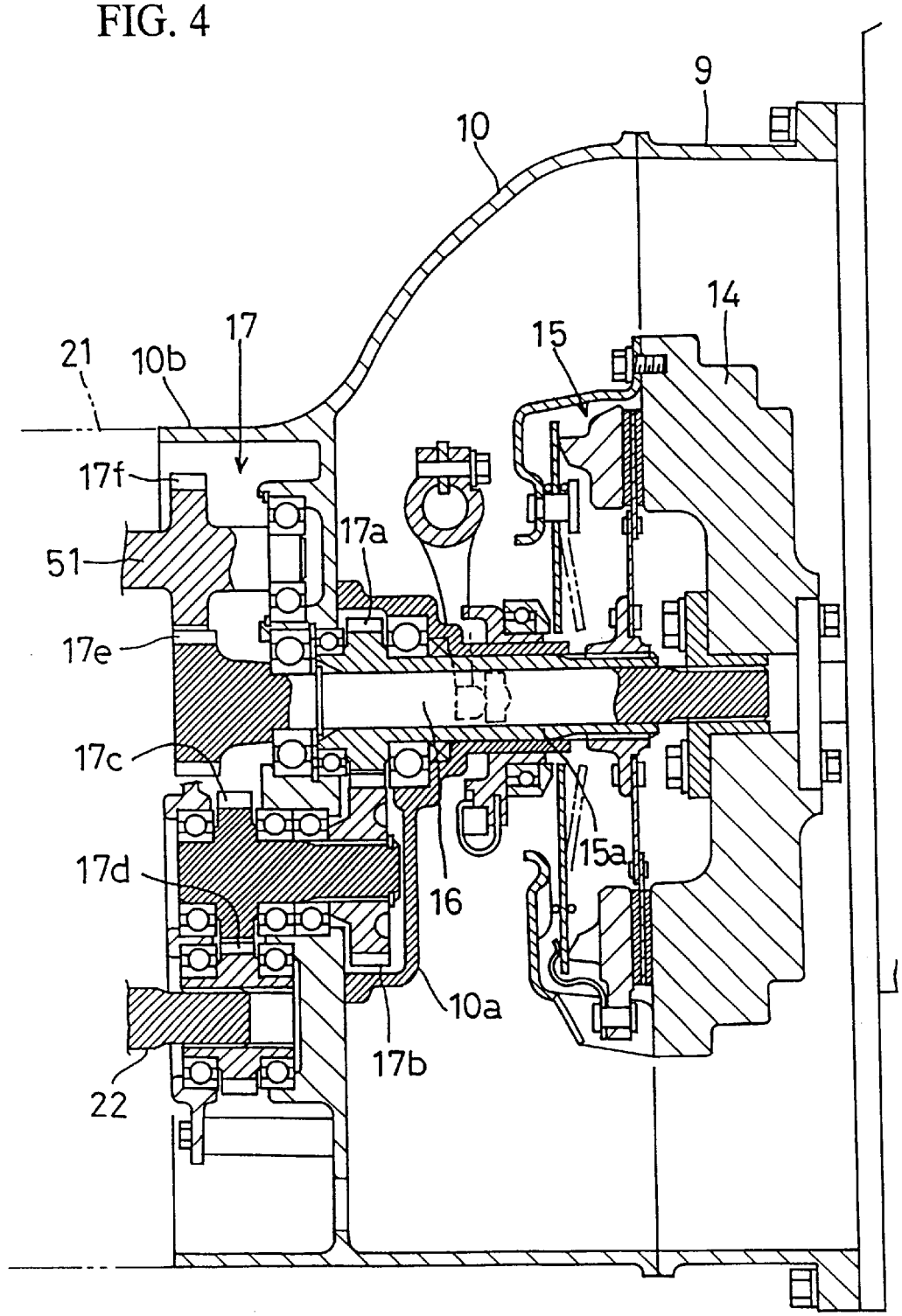
FIG. 4 is a sectional view of a main clutch and a power branching mechanism.

As shown in FIG. 3, a front wheel transmission case 11 supported by the right and left front frames 8 contains a front differential 12. The differential case portion 5b contains a rear differential 13. The flywheel housing 9 contains a flywheel 14 acting as an engine output member. The main clutch housing 10 contains a main clutch 15. The forward end of a rotary shaft 16 is splined to the flywheel 14. A power branching mechanism 17 is disposed between the main clutch 15 and HST case 21 for dividing power of engine E into propelling power transmitted to the front and rear wheels 1 and 2, and power transmitted to the working implement through the PTO shaft 7. As shown in FIG. 4, a case part 10a is bolted to a front surface of a rear portion of main clutch housing 10. A transmission case part 10b is in the rear portion of main clutch housing 10. The power branching mechanism 17 is disposed in the case parts 10a and 10b. Further, a main transmission 20 is disposed in HST case 21, and an auxiliary transmission 40 (propelling transmission) in the transmission case 5.

With the above transmission structure, torque output of engine E divided by the power branching mechanism 17 as propelling power is transmitted to the front and rear differentials 12 and 13. The front and rear wheels 1 and 2 are thereby driven, so that the tractor functions as a self-propelled vehicle.

Specifically, torque of the flywheel 14 is transmitted to the power branching mechanism 17 through the main clutch 15 and rotary shaft 16. The power branching mechanism 17 has a first output gear 17d for transmitting torque to an input shaft 22 of the main transmission 20. The main transmission 20 has an output shaft 23 for transmitting torque through a gear mechanism 18 to an input shaft 41 of the auxiliary transmission 40. The auxiliary transmission 40 has an output shaft 42 for transmitting torque to the rear differential 13 through an output gear 43 formed integral with the rear end of the output shaft 42. The output shaft 42 transmits the torque also to the front differential 12 through a front wheel driving output gear 44 mounted on the output shaft 42 to be rotatable therewith, and a front wheel transmission shaft 19 having a rear end thereof interlocked to the output gear 44 through a gearing.

The auxiliary transmission 40 receives the torque from the main transmission 20, and transmits it in three speeds to the front and rear wheels 1 and 2. The auxiliary transmission 40 includes a transmission shaft 41a coupled to the input shaft 41 to be rotatable therewith, a first shift gear 45 splined to the transmission shaft 41a to be rotatable therewith and slidable thereon, a second shift gear 46 splined to the output shaft 42 to be rotatable therewith and slidable thereon, a gear 47 relatively rotatably mounted on the transmission shaft 41a, a gear 48 relatively rotatably mounted on the output shaft 42, and a gear 49 formed integral with the transmission shaft 41a. In this construction, the first shift gear 45 is selectively engageable with the gear 47 and gear 48, while the second shift gear 46 is selectively engageable with the gear 49 and gear 48. As a result, the torque of the input shaft 41 is changed into three speeds to be outputted from the output shaft 42.

On the other hand, the other part of power branching from the power branching mechanism 17 is transmitted, through an implement driving transmission 50 disposed in the transmission case 5, to the PTO shaft 7 rotatably supported at the rear end of the transmission case 5.

More particularly, the power branching mechanism 17, as shown in FIG. 4, includes a first input gear 17a formed integral with the rear end of a tubular output shaft 16a of main clutch 15 to be rotatable therewith, a first transmission gear 17b meshed with the first input gear 17a, a second transmission gear 17c having a shaft portion thereof splined to the first transmission gear 17b to be rotatable therewith, the above-mentioned first output gear 17d meshed with the second transmission gear 17c, a second input gear 17e formed integral with the rear end of the rotary shaft 16 relatively rotatably extending through the tubular output shaft 15a, and a second output gear 17f meshed with the second input gear 17e. The first output gear 17d is splined to the input shaft 22 of the main transmission 20 to be rotatable therewith. The second output gear 17f is formed integral with an input shaft 51 of the implement driving transmission 50 to be rotatable therewith.

The power branching mechanism 17 divides the torque output of engine E into a line connectable and disconnectable by the main clutch 15 and a line through the rotary shaft 16 not connectable and disconnectable. The engine output through the connectable and disconnectable line is transmitted to the front and rear wheels 1 and 2 by way of the input shaft 22 of the main transmission 20. On the other hand, the engine output through the line not connectable and disconnectable is transmitted to the PTO shaft 7 by way of the input shaft 51 of the implement driving transmission 50. The implement driving transmission 50 further includes a multidisk clutch 52 engageable by pressure oil supply, an output shaft 53 of the clutch 52, and a rotary shaft 55 having one end thereof coupled to the output shaft 53 through a gear mechanism 54, and the other end coupled to the PTO shaft 7 through a coupling to be rotatable therewith. The power branching mechanism 17 divides the engine output into the two lines as noted above. The torque output of engine E is transmitted to the implement driving transmission 50 independently of the main transmission 20 and auxiliary transmission 40 on the propelling line. Consequently, the implement driving power is not variable by a shifting operation of the main transmission 20 or auxiliary transmission 40. The power transmitted to the implement driving transmission 50 is connected to and disconnected from the PTO shaft 7 by the multidisk clutch 52.

Figure 5:
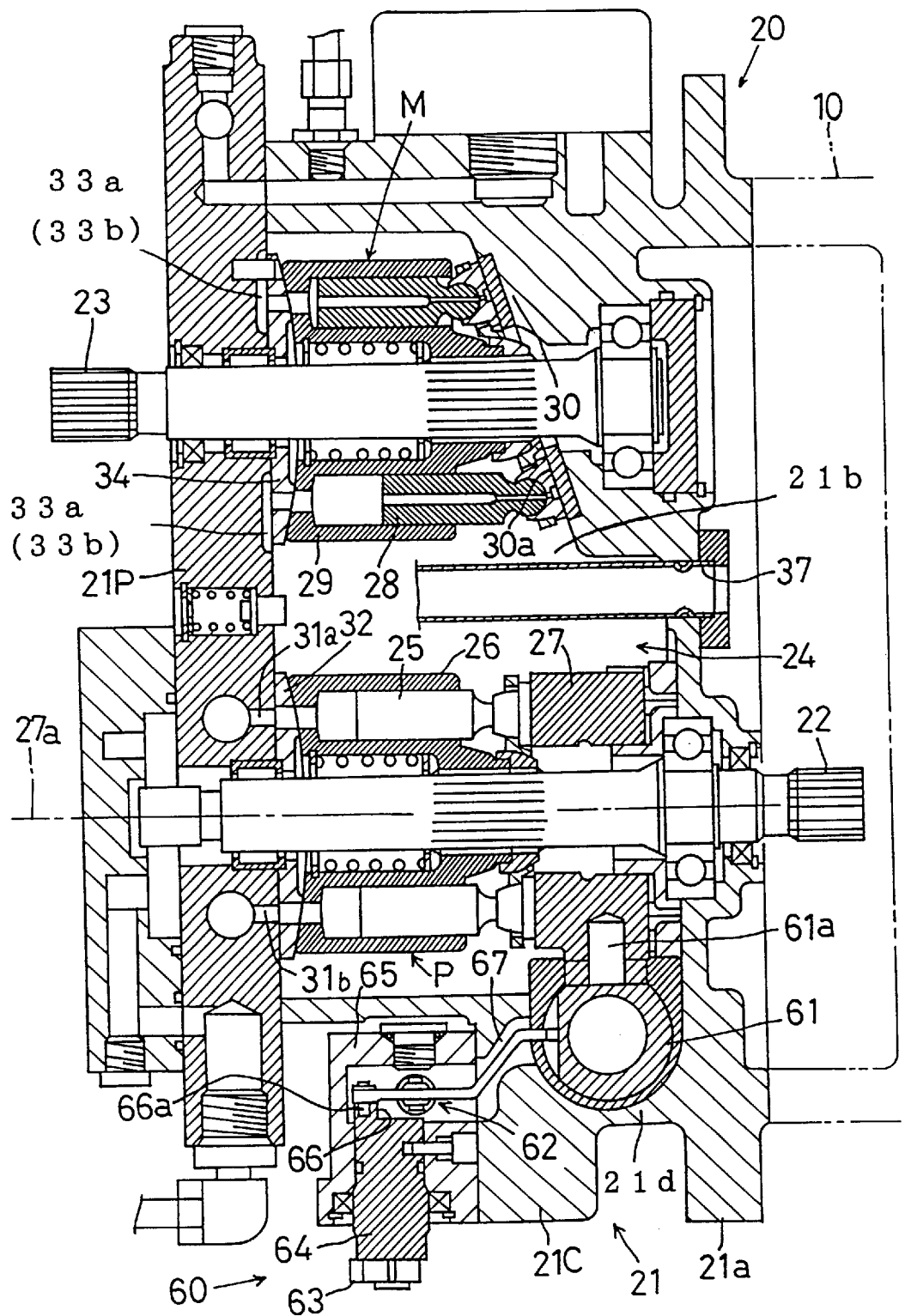
FIG. 5 is a sectional view of a propelling stepless transmission.
Figure 6:
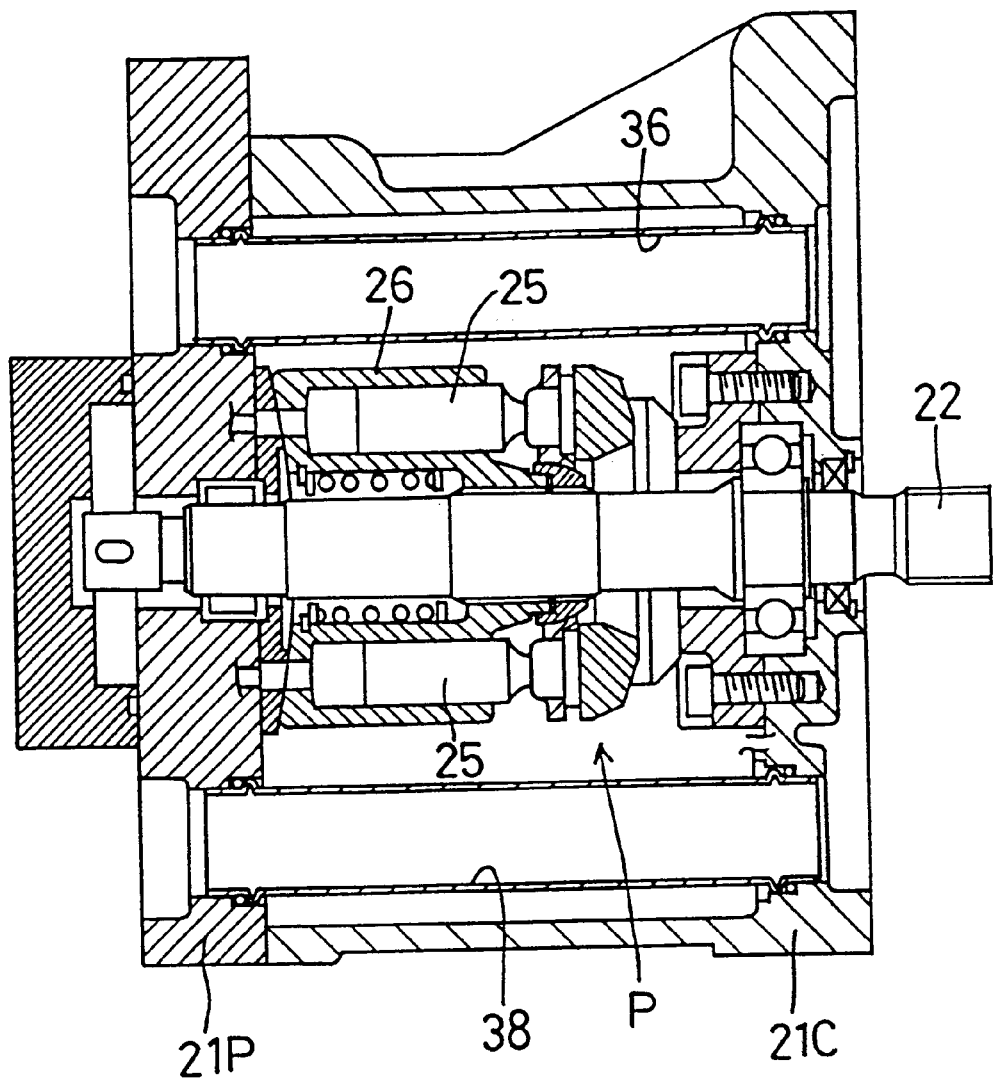
FIG. 6 is a sectional view of a hydraulic pump forming part of the propelling stepless transmission.

As shown in FIGS. 5 and 6, the main transmission 20 includes a variable capacity hydraulic motor M and a fixed capacity hydraulic pump P. The hydraulic pump P is driven by the input shaft 22. The hydraulic motor M is driven by pressure oil from the hydraulic pump P, and drives the output shaft 23 of the main transmission 20. Both the hydraulic pump P and hydraulic motor M are disposed in the HST case 21. The main transmission 20 is constructed as a hydraulic stepless transmission. The main transmission 20 is located adjacent the rear end of the main clutch 15. The hydraulic pump P and hydraulic motor M convert the engine output transmitted to the input shaft 22 into forward drive or backward drive, steplessly changes speed of the forward drive or backward drive, and transmits the drive from the output shaft 23 to the auxiliary transmission 40. Details of the main transmission 20 are as follows.

The HST case 21 includes a main HST case body 21C formed of cast iron and a port block 21P also formed of cast iron. The main HST case body 21C has a flange 21a bolted to the transmission case part 10b of the main clutch housing 10, and a recess 21b opening rearwardly of the vehicle body. The port block 21P is bolted to a rear end surface of the main HST case body 21C to close the opening of recess 21b, and defines a flange bolted to the main transmission case body 5a. The HST case 21 has an oil chamber 24 defined by the recess 21b for accommodating the hydraulic pump P and hydraulic motor M along with oil. Thus, the hydraulic pump P and hydraulic motor M are arranged in an oil sump to be free from air.

The hydraulic pump P and hydraulic motor M are arranged in the oil chamber 24 transversely of the vehicle body. The hydraulic pump P is in the form of an axial plunger pump. The hydraulic pump P includes a plurality of plungers 25 arranged around the input shaft 22 of the main transmission 20, a cylinder block 26 slidably receiving these plungers 25 and rotatable about the axis of input shaft 22, and a ring-shaped swash plate 27 fitted adjacent one end of input shaft 22 and pivotable relative to the HST case 21. The hydraulic motor M is in the form of an axial plunger motor. The hydraulic motor M includes a plurality of plungers 28 arranged around the output shaft 23 of the main transmission 20, a cylinder block 29 slidably receiving these plungers 28 and rotatable with the output shaft 23, and a swash plate 30 mounted in HST case 21 and formed integral with the main HST case body 21C. With rotation of the cylinder block 29, the swash plate 30 causes the plungers 28 to slide back and forth relative to the cylinder block 29. The swash plate 30 has a cam plate attached thereto and defining a cam surface 30a. The cam surface 30a is inclined to extend laterally outwardly and rearwardly of the vehicle body.

Figure 7:
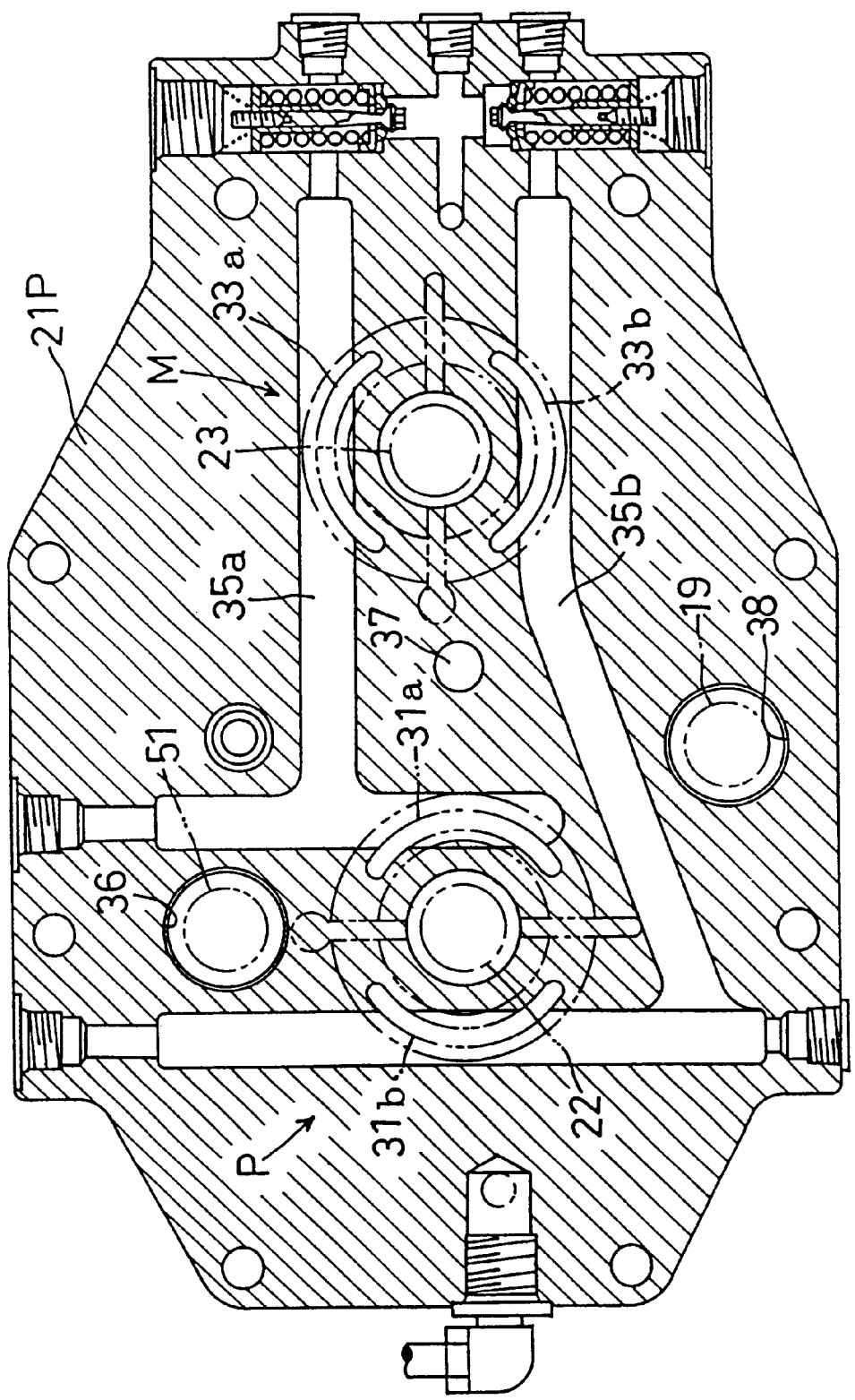
FIG. 7 is a sectional view of oil lines for driving the stepless transmission.

As shown in FIGS. 5 and 7, the hydraulic pump P has two arc-shaped inlet/outlet ports 31a and 31b juxtaposed transversely of the vehicle body. The inlet/outlet ports 31a and 31b are formed in an inward portion of port block 21P and a valve plate 32 fixed to an inward surface of port block 21P. The hydraulic motor M also has arc-shaped inlet/outlet ports 33a and 33b formed in the inward portion of port block 21P and a valve plate 34 fixed to the inward surface of port block 21P. The inlet/outlet ports 33a and 33b of motor M are arranged vertically of the vehicle body. That is, the inlet/outlet ports 33a and 33b of motor M are arranged in a different direction to the inlet/outlet ports 31a and 31b of pump P. One inlet/outlet port 31a of the pump and one inlet/outlet port 33a of the motor are connected to each other by an oil line 35a in the form of a bore in the port block 21P. The other inlet/outlet port 31b of the pump and the other inlet/outlet port 33b of the motor are connected to each other by an oil line 35b in the form of another bore in the port block 21P. That is, when ouputting forward drive, the inlet/outlet port 31a or 31b of hydraulic pump P acts as a drain port, and the inlet/outlet port 33a or 33b of hydraulic motor M communicating therewith acts as an intake port. At this time, the other inlet/outlet port 33b or 33a of hydraulic motor M acts a drain port, and the inlet/outlet port 31b or 31a of hydraulic pump P communicating therewith acts as an intake port. Conversely, when outputting backward drive, the other inlet/outlet port 31b or 31a of hydraulic pump P acts as a drain port, and the inlet/outlet port 33b or 33a of hydraulic motor M communicating therewith acts as an intake port. At this time, the other inlet/outlet port 33a or 33b of hydraulic motor M acts as a drain port, and the inlet/outlet port 31a or 31b of hydraulic pump P communicating therewith acts as an intake port. In either case, i.e. whether to output forward drive or backward drive, pressure oil is supplied from the hydraulic pump P to the hydraulic motor M through the oil line 35a or 35b, and returned from the hydraulic motor M to the hydraulic pump P through the oil line 35b or 35a.

As shown in FIG. 5, the swash plate 27 of hydraulic pump P has an angle variable by a swash plate control unit 60 including a hydraulic servo cylinder 61 and a hydraulic servo valve 62 as main components thereof. The servo cylinder 61 is incorporated into a cylinder mount 21d formed integral with the main HST case body 21C to be on the left side surface (the side surface adjacent the hydraulic pump P) of HST case 21. The longitudinal direction of servo cylinder 61 extends vertically of the vehicle body. The servo cylinder 61 has a control pin 61a projecting therefrom into engagement with the swash plate 27. The hydraulic servo valve 62 is attached to an outer surface of cylinder mount 21d, with the longitudinal direction of valve 62 extending vertically of the vehicle body.

Figure 8:
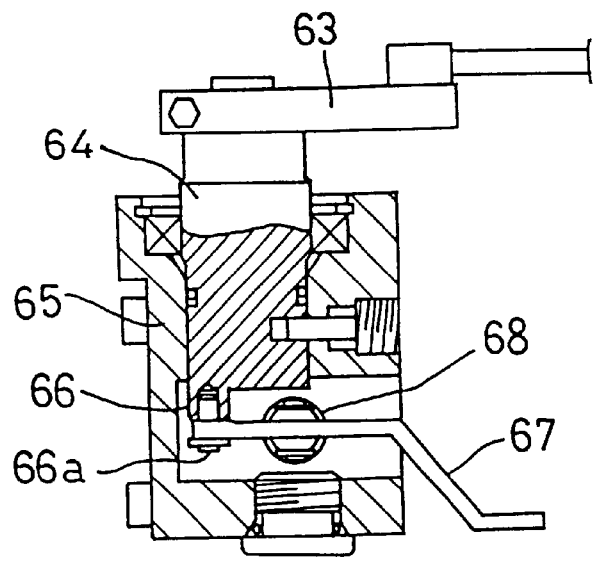
FIG. 8 is a sectional view of a servo valve controller.
Figure 9:
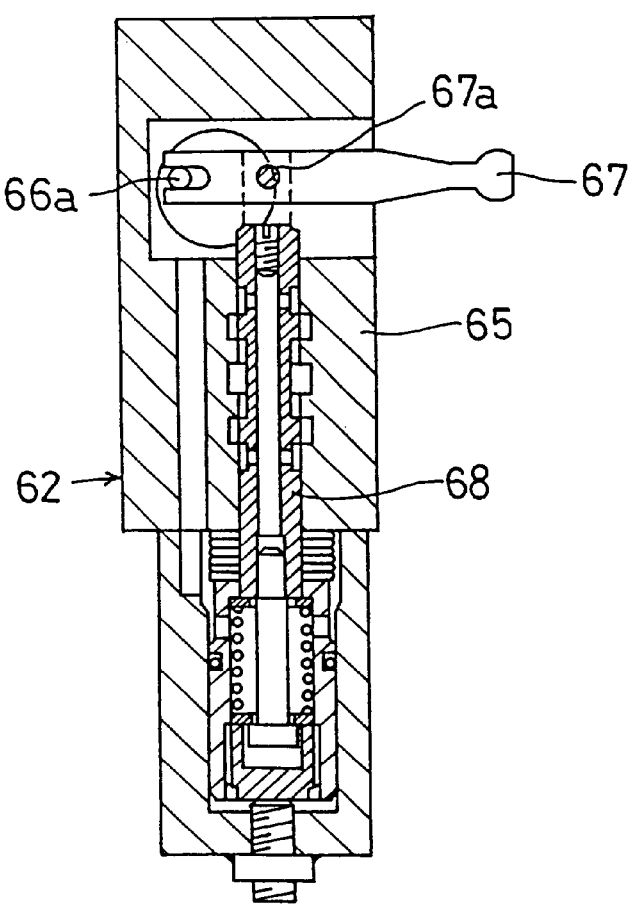
FIG. 9 is a sectional view of a servo valve.

FIGS. 8 and 9 show details of the servo valve 62 and a valve controller 66. The servo valve 62 has a control lever 63 supported by a valve case 65 through a rotary support shaft 64. The valve controller 66 extends from the rotary support shaft 64. The valve controller 66 is engaged with one end of a valve control link 67 through a coupling pin 66a. The other end of valve control link 67 is engaged with the servo cylinder 61. The valve control link 67 is connected in an intermediate position thereof to a valve spool 68 by a coupling pin 67a. In this construction, when the control lever 63 is swung about the axis of rotary support shaft 64, the rotary support shaft 64 rotates with the control lever 63. The valve controller 66 pivots in the valve case 65 about the axis of rotary support shaft 64, which swings the valve control link 67 through the coupling pin 66a (the valve control link 67 being pivotable about the other end engaged with the servo cylinder 41). Then, the coupling pin 67a of valve control link 67 moves from a neutral position in the same direction as the direction of movement of coupling pin 66a, to switch the valve spool 68 from the neutral position to a drive position. When the valve spool 68 is switched to the drive position, the servo cylinder 61 is driven by pressure oil. As shown in FIG. 5, the control pin 61a swings the swash plate 27 to a forward drive position or a backward drive position and in an accelerating or decelerating direction corresponding to the direction of movement of the control lever 63. The servo cylinder 61 swings the swash plate 27 while swinging the valve control link 67. (At this time, the valve control link 67 pivots about the coupling pin 66a of valve controller 66). When the swing of the swash plate 27 reaches an angle proportional to the stroke of control lever 63, the coupling pin 67a of valve control link 67 returns to the neutral position to return the valve spool 68 to the neutral position. Thus, when the swash plate 27 moves in a direction corresponding to the direction of movement of control lever 63 and by an angle proportional to the stroke of control lever 63, the servo valve 62 automatically returns to neutral. The servo cylinder 61 stops to stop the swash plate 27.

As shown in FIGS. 5 through 7 and 11, the stepless transmission 20 has three bores 36–38. Each bore is defined by a pipe extending from a front wall of the main HST case body 21C to the port block 21P. The first bore 36 located at the highest level receives the input shaft 51 of the implement driving transmission 50. The second bore 37 at an intermediate level is provided for circulating a lubricant through interiors of transmission case part 10b and transmission case 5. The third bore 38 at the lowest level receives the front wheel transmission shaft 19.

Figure 10:
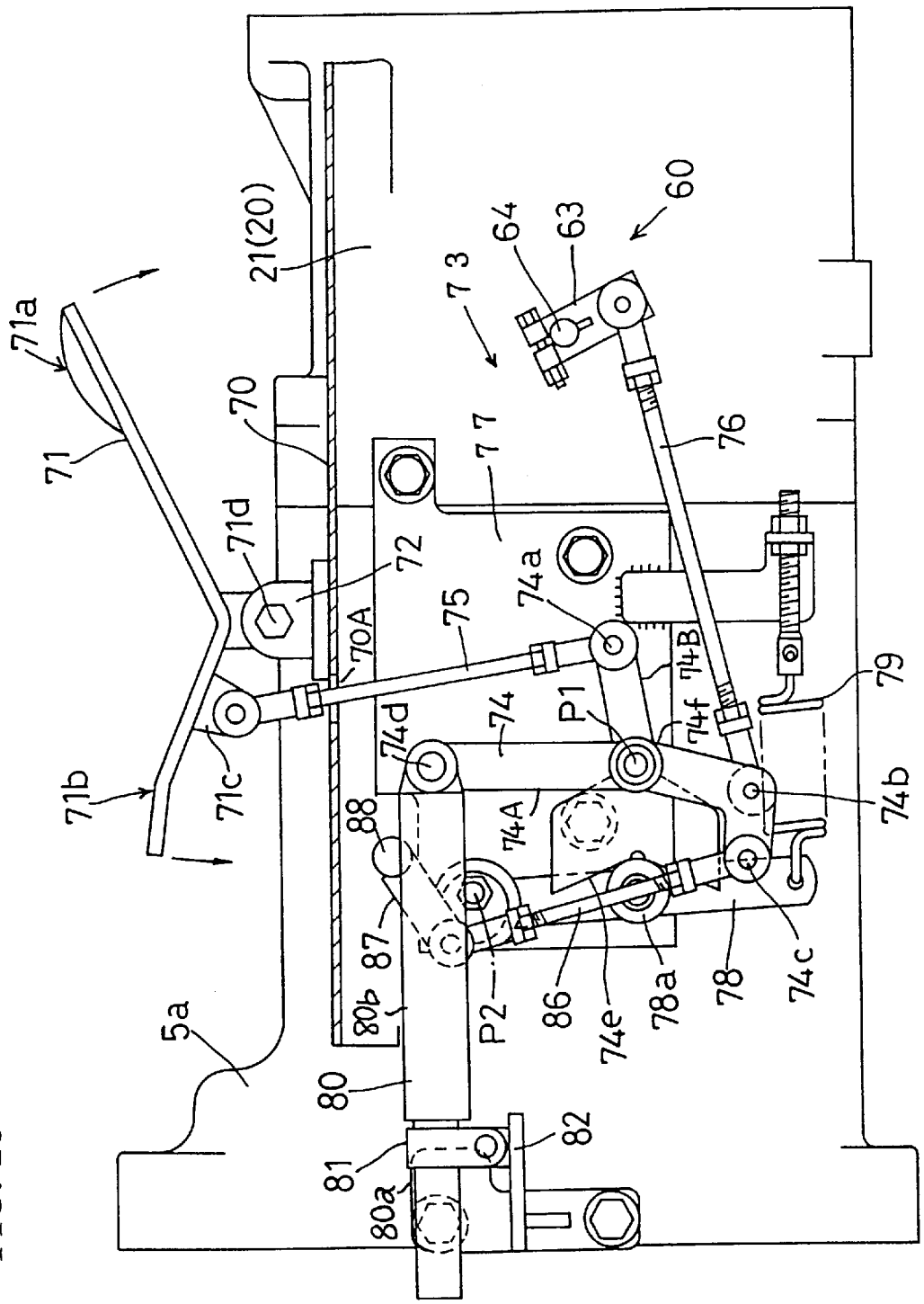
FIG. 10 is a side view of an interlocking mechanism between a change speed pedal and the stepless transmission.
Figure 15:
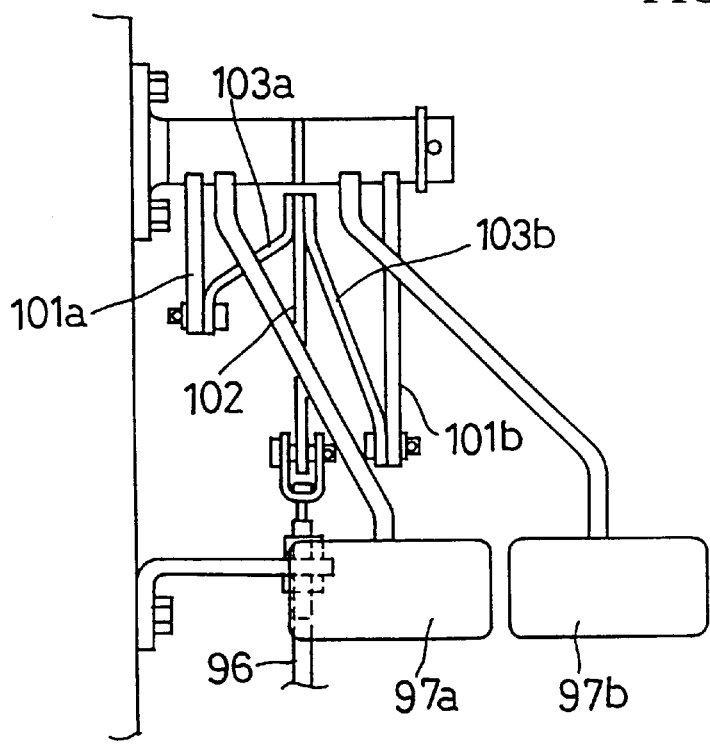
FIG. 15 is a plan view of the change speed pedal.

FIG. 10 shows a speed control structure for controlling the stepless transmission 20. This speed control structure includes a change speed pedal 71 supported by a driving deck 70. As shown in FIG. 15, the change speed pedal 71 is a single pedal integrating a forward drive control end 71a and a backward drive control end 71b. The forward drive control end 71a is offset laterally outwardly from the backward drive control end 71*b*. Thus, the forward drive control end 71*a* may be depressed with ease by the tip of a foot, and the backward drive control end 71*b* by the heel. In FIG. 10, numeral 71*c* denotes an output to an interlocking mechanism 73 (described hereinafter), and numeral 71*d* denotes a fulcrum or pivotal axis of the change speed pedal 71. The pivotal axis 71*d* extends through a bracket 72 supported on the driving deck 70.

The change speed pedal 71 is located at a higher level than the stepless transmission 20. As seen from a side of the vehicle body, the rear end of the forward drive control end 71*a* of change speed pedal 71 lies over the stepless transmission 20 in the fore and aft direction of the vehicle body. The stepless transmission 20 is located forwardly of the pivotal axis 71*d* of change speed pedal 71.

The interlocking mechanism 73 operatively connecting the change speed pedal 71 to the servo valve 62 provided for the swash plate control unit 60 of the hydraulic pump P includes a link 74, a first rod 75 and a second rod 76. The link 74 is supported, to be pivotable about a transverse axis P1, by a support member 77 bolted to a side of body frame F. Thus, the link 74 is supported by the body frame F to be pivotable about the axis P1. The link 74 has four, first to fourth connection points 74*a*–74*d* distributed around the axis P1, and one cam follower 74*e*. The first rod 75 interlocks the link 74 to the change speed pedal 71 by connecting the first connection point 74*a* located forwardly of the axis P1 to the output 71*c* of change speed pedal 71. The first rod 75, when mounted in place, extends vertically of the vehicle body, and substantially perpendicular to the driving deck 70 through a bore 70A formed therein. The second rod 76 interlocks the link 74 to the control lever 63 of servo valve 62 by connecting the second connection point 74*b* located below the pivotal axis P1 and first connection point 74*a* to the control lever 63. The second rod 76, when mounted in place, extends substantially along the fore and aft direction of the vehicle body.

A cam member 78 is provided to impart an operational resistance to the change speed pedal 71 and control lever 63 and apply a force for automatically returning these components to their neutral positions. For this purpose, the cam member 78 has a cam 78*a* in the form of a roller attached to an intermediate position thereof. The cam 78*a* acts on the cam follower 74*e* located rearwardly of the pivotal axis P1 of link 74. The cam member 78 is supported by the support member 77 to be pivotable about a transverse axis P2. Thus, when the support member 77 is assembled to the body frame F, the cam member 78 and link 74 are assembled to the body frame F all at once. A spring 79 extends between the cam member 78 and support member 77. The spring 79 biases the cam member 78 toward the link 74 to place the cam 78*a* in contact with the cam follower 74*e* of link 74. The cam 78*a* of cam member 78 is pressed by the elastic restoring force of spring 79 against a curved portion of cam follower 74*e*, thereby to apply a resistance to the pivotal movement of the link 74. The position of the link 74 at this time places the change speed pedal 71 and control lever 63 in the neutral positions.

Numeral 80 denotes a damper. Numeral 81 denotes a damper holder for supporting a rod 80*a* of damper 80. Numeral 82 denotes a support member fixed to the body frame F for pivotably supporting the damper holder 81. The damper 80 has a tube 80*b* disposed opposite the first rod 75 and second rod 76 across the link 74. The tube 80*b* is pivotally connected to the fourth connection point 74*d* located above the pivotal axis P1. The damper 80 in this way damps any vibration of the change speed pedal 71 and control lever 63 through the link 74, which vibration may be transmitted from the swash plate 27. Further, the damper 80 imparts an operational resistance to the change speed pedal 71 through the link 74 and the first rod 75 to prevent a sudden operation of the change speed pedal 71.

The link 74 includes three components, i.e. a first arm 74A, a second arm 74B and the cam follower 74*e*. The first arm 74A has a boss 74*f* connected to the support member 77, and the second connection point 74*b*, third connection point 74*c* and fourth connection point 74*d*. The second arm 74B is connected to the boss 74*f* to be pivotable therewith, and has the first connection point 74*a*. The cam follower 74*e* is connected to the boss 74*f* to be pivotable therewith.

When the driver depresses the forward drive control end 71*a* from the neutral position of change speed pedal 71, this control force is transmitted to the control lever 63 of servo valve 62 through the interlocking mechanism 73. Consequently, the control lever 63 pivots forwardly of the vehicle body to switch the servo valve 62 to a forward position, which switches the stepless transmission 20 from neutral to the forward drive position. As a result, the vehicle body runs forward. When the driver further depresses the forward drive control end 71*a*, the control lever 63 pivots to an increased extent forwardly of the vehicle body, thereby enlarging a swash plate angle variable by the servo cylinder 61, whereby the stepless transmission 20 provides a higher speed. As a result, the vehicle is accelerated in running forward. On the other hand, when the driver depresses the backward drive control end 71*b* from the neutral position of change speed pedal 71, this control force is transmitted to the control lever 63 of servo valve 62 through the interlocking mechanism 73. Consequently, the control lever 63 pivots rearwardly of the vehicle body to switch the servo valve 62 to a backward position, which switches the stepless transmission 20 from neutral to the backward drive position. As a result, the vehicle body runs backward. When the driver further depresses the backward drive control end 71*b*, the control lever 63 pivots to an increased extent rearwardly of the vehicle body, thereby enlarging a swash plate angle variable by the servo cylinder 61, whereby the stepless transmission 20 provides a higher speed. As a result, the vehicle is accelerated in running backward.

When the driver releases the change speed pedal 71 during a forward or backward run, the change speed pedal 71 and control lever 63 are automatically returned to the neutral positions by the neutral restoring action of the cam member 78 as already described. Consequently, the stepless transmission 20 is switched to the decelerating position to decelerate the vehicle. Finally, the change speed pedal 71 and control lever 63 are restored to the neutral positions to return the stepless transmission 20 to neutral, thereby stopping the vehicle. At this time, the control lever 63 and change speed pedal 71 are firmly retained in the neutral positions by the damping action of the damper 80 and the positioning action of the cam member 78.

Figure 11:
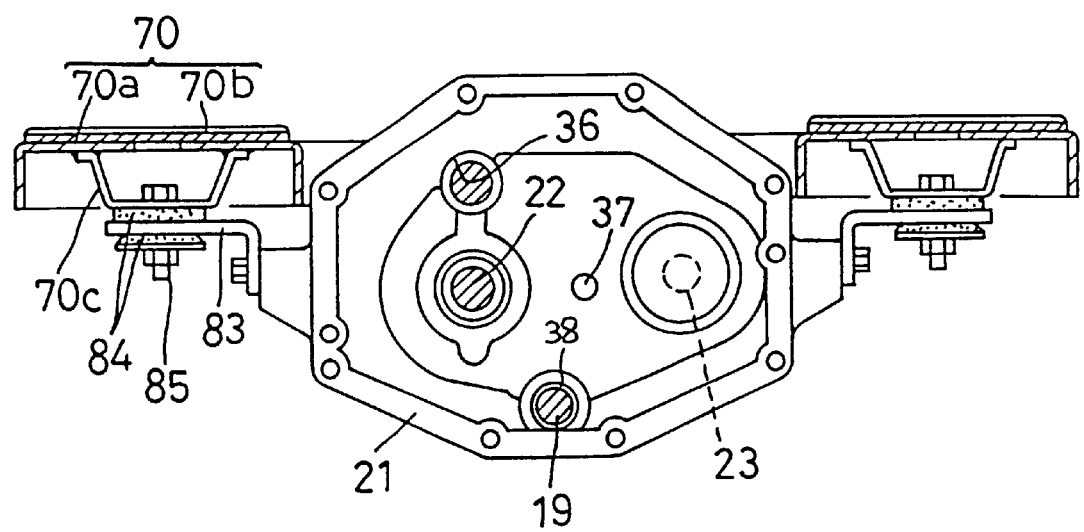
FIG. 11 is a sectional view of a driving deck.

As shown in FIG. 11, the driving deck 70 includes a main deck body 70*a* formed of sheet metal and supported by the body frame F, and a rubber sheet cushion 70*b* laid on the upper surface of main deck body 70*a*. The main deck body 70*a* is attached to the body frame F in a plurality of fore and aft positions at each side by mounting structures as shown in FIG. 11. Specifically, each mounting element 70*c* on the lower surface of the main deck body 70*a* is placed on a deck support member 83 through a rubber cushion 84 and retained in place by a mounting bolt 85 extending through the rubber cushion 84. Thus, the driving deck 70 is supported by the body frame F through the rubber cushions 84 to damp vibration from the body frame F. The deck support member 83 is connected, for example, to a side of the main transmission case body 5a forming the body frame F.

Figure 12:
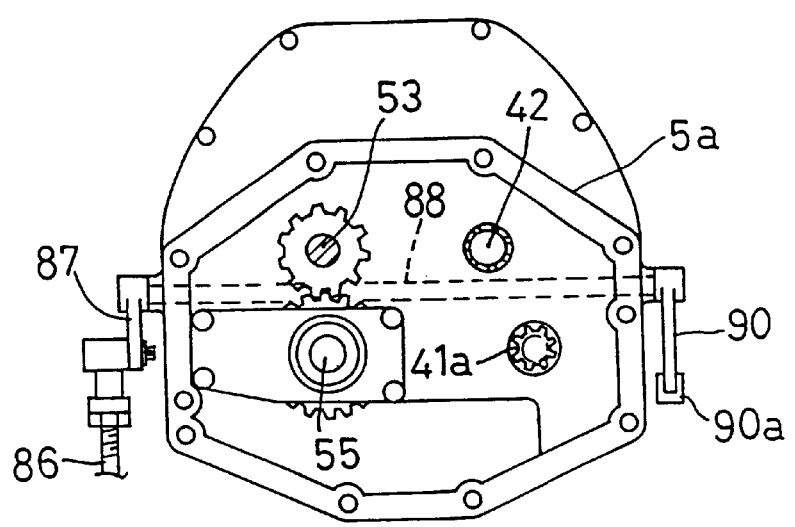
FIG. 12 is a sectional view of a speed retainer.

As shown in FIG. 10, a speed retainer 87 is connected through a rod 86 to the third connection point 74c which is located below and rearwardly of the pivotal axis P1 of the link 74. This speed retainer 87 is disposed opposite the first rod 75 and second rod 76 across the link 74. As shown in FIG. 12, the speed retainer 87 is pivotably supported by an upper portion of the main transmission case body 5a through a rotary support shaft 88.

Figure 13:
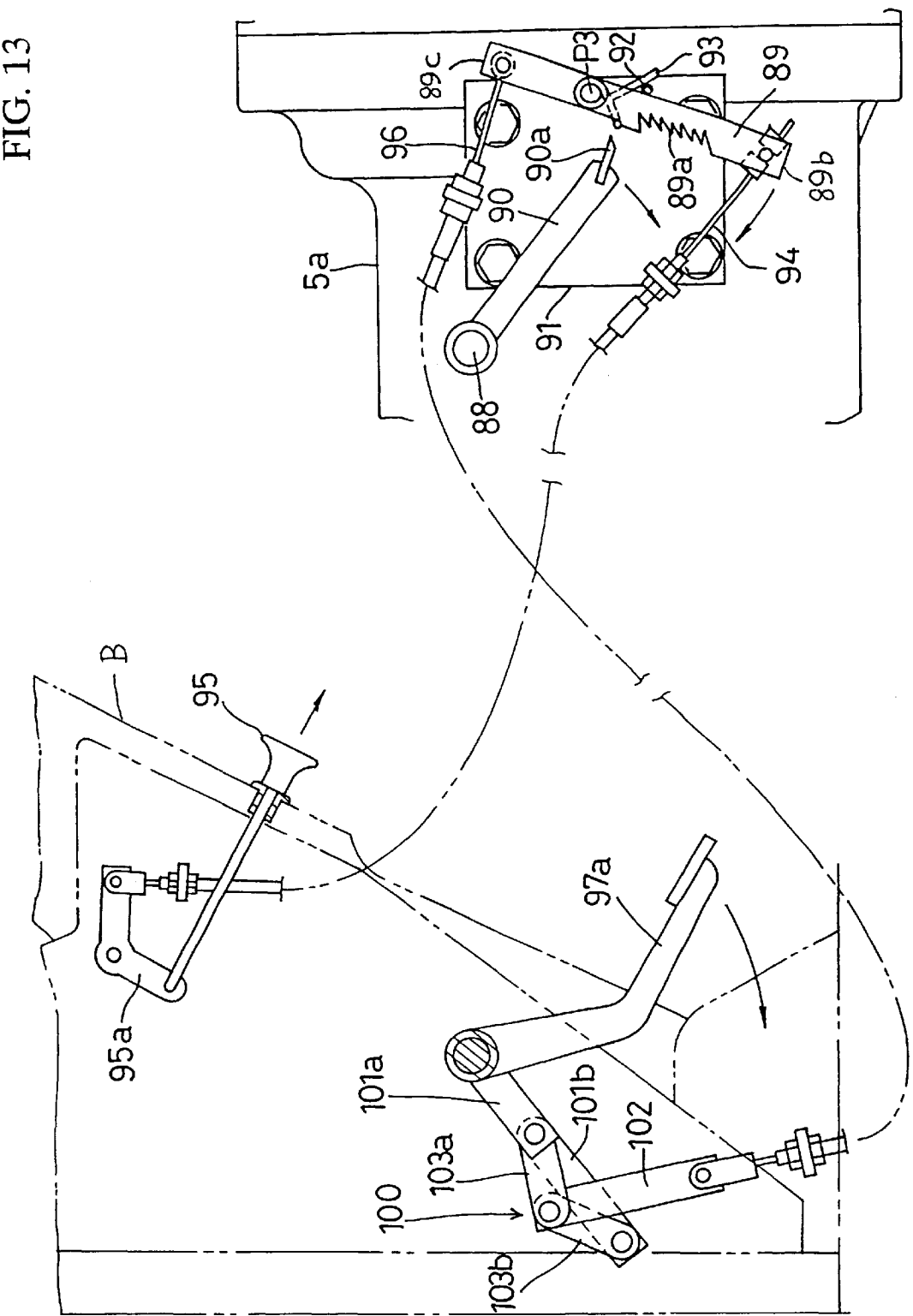
FIG. 13 is a side view of a cruising device.

As shown in FIGS. 12 and 13, a lock 89 is disposed on the side surface of the main transmission case body 5a opposite from the speed retainer 87 for locking and unlocking the speed retainer 87. This lock 89 forms part of a cruising device for locking the stepless transmission 20 to a desired running speed.

Specifically, the speed retainer 87 is connected to one end of the rotary support shaft 88, and a lock arm 90 is connected to the other end thereof (at the same side of the main transmission case body 5a where the lock 89 is disposed), to be pivotable with rotation of the rotary support shaft 88. The lock 89 has sawteeth 89a for acting on the lock arm 90 by engaging an engaging piece 90a disposed at a distal end of the lock arm 90. The lock 89 is supported by a support member 91 bolted to a side of the main transmission case body 5a, to be pivotable about an axis P3, and is biased to an unlock position by an unlock spring 93. In the unlock position, the unlock spring 93 contacts a stopper pin 92 behind the sawteeth 89a. The lock 89 is pivotable by a control member 95 slidably attached to a panel B disposed below the steering wheel 3. The control member 95 is operatively connected to a free end 89b of the lock 89 through a pivotal link 95a and a control cable 94.

In the above construction, the driver draws the control member 95 from the panel B toward the driver's seat 4 while depressing the change speed pedal 71 to the forward side to set the stepless transmission 20 to a desired speed. The lock 89 thereby pivots about the axis P3 clockwise in FIG. 13 against the biasing force of the unlock spring 93 to engage the sawteeth 89a with the engaging piece 90a of the lock arm 90. The engagement of lock 89 and lock arm 90 is maintained against the biasing force of unlock spring 93. The lock 89 locks the speed retainer 87 through the lock arm 90 and rotary support shaft 88 to a position corresponding to the set speed of the stepless transmission 20 against the neutral restoring force of the cam member 78. As shown in FIG. 10, the speed retainer 87 locked in this way locks the control lever 63 of pump control unit 60 through the rod 86, link 74 and second rod 76 and against the neutral restoring force, to a position set by the change speed pedal 71. Thus, the stepless transmission 20 may be fixed to the desired speed set by the change speed pedal 71, When, in this state, the driver pushes the control member 95 back to the panel B to cancel the engagement between the lock 89 and lock arm 90, the lock 89 returns to the unlock position under the biasing force of the unlock spring 93, thereby releasing the speed retainer 87 to unlock the stepless transmission 20 from the set speed.

As shown in FIG. 13, the other free end (remote from the free end 89b to which the control cable 94 is connected) of the lock 89 has, connected thereto, one end of a control cable 96 interlocked to a pair of right and left brake pedals 97a and 97b. An interlock regulating mechanism 100 is disposed between the other end of control cable 96 and the pair of right and left brake pedals 97a and 97b for regulating the interlocking between the lock 89 and the two brake pedals 97a and 97b.

Figure 14:
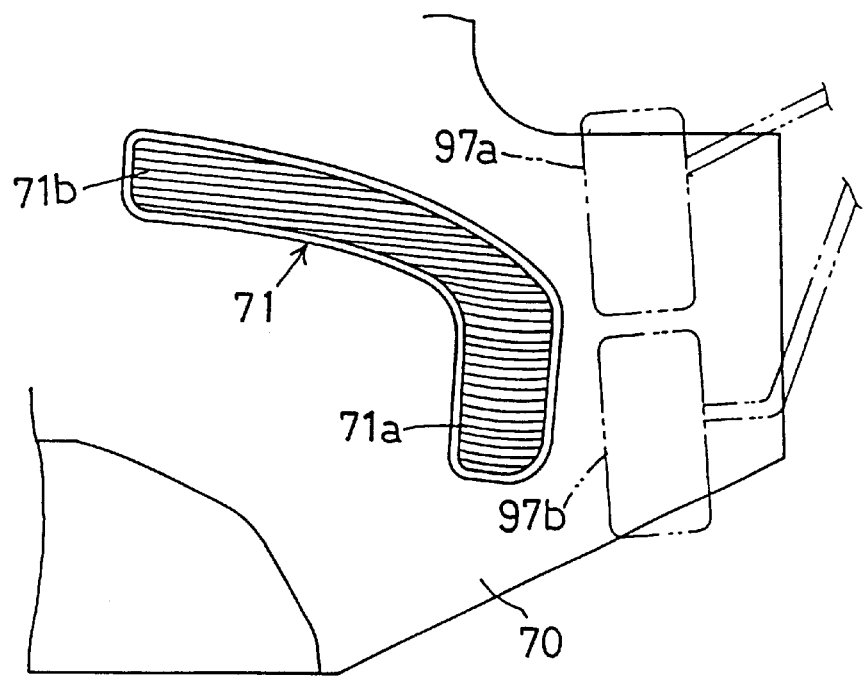
FIG. 14 is a plan view of brake pedals.

As shown in FIGS. 13 and 14, the interlock regulating mechanism 100 includes a left control arm 101a extending from a boss of left brake pedal 97a to be pivotable therewith, a right control arm 101b longer than the left control arm 101a and extending from a boss of right brake pedal 97b to be pivotable therewith, a lock control link 102 disposed between the right and left control arms 101a and 101b and connected to the control cable 96, a left control link 103a having one end thereof pivotally connected to the lock control link 102 and the other end pivotally connected to a free end of the left control arm 101a, and a right control link 103b having one end thereof pivotally connected to the lock control link 102 and the other end pivotally connected to a free end of the right control arm 101b.

FIGS. 16(a), (b) and (c) illustrate operation of the interlock regulating mechanism 100. When only the left brake pedal 97a is depressed as shown in FIG. 16(a), the left control arm 101a pivots with the pedal 97a but the right control arm 101b remains still. The left control link 103a only pivots about a point of connection 104 with the lock control link 102 and does not move the lock control link 102. As a result, the lock control link 102 does not pull the control cable 96. When only the right brake pedal 97b is depressed as shown in FIG. 16(b), the right control arm 101b pivots with the pedal 97b but the left control arm 101a remains still. The right control link 103b only pivots about the point of connection 104 with the lock control link 102 and does not move the lock control link 102. As a result, the lock control link 102 does not pull the control cable 96. When both the left brake pedal 97a and right brake pedal 97b are depressed as shown in FIG. 16(c), the left control arm 101a and right control arm 101b pivot to move the lock control link 102 in the direction of movement of the control arms 101a and 101b through the left control link 103a and right control link 103b. As a result, the lock control link 102 pulls the control cable 96 to switch the lock 89, if in the lock position, from the lock position to the unlock position.

That is, even when the driver brakes only one of the right and left rear wheels 2 during a run with the stepless transmission 20 locked to a set speed, the stepless transmission 20 is not released from the set speed. The vehicle can make a small turn with an outer one of the rear wheels driven at the set speed. When the driver brakes both of the right and left rear wheels 2, the stepless transmission 20 is automatically released from the set speed to be switchable to a non-drive state.

Figure 22:
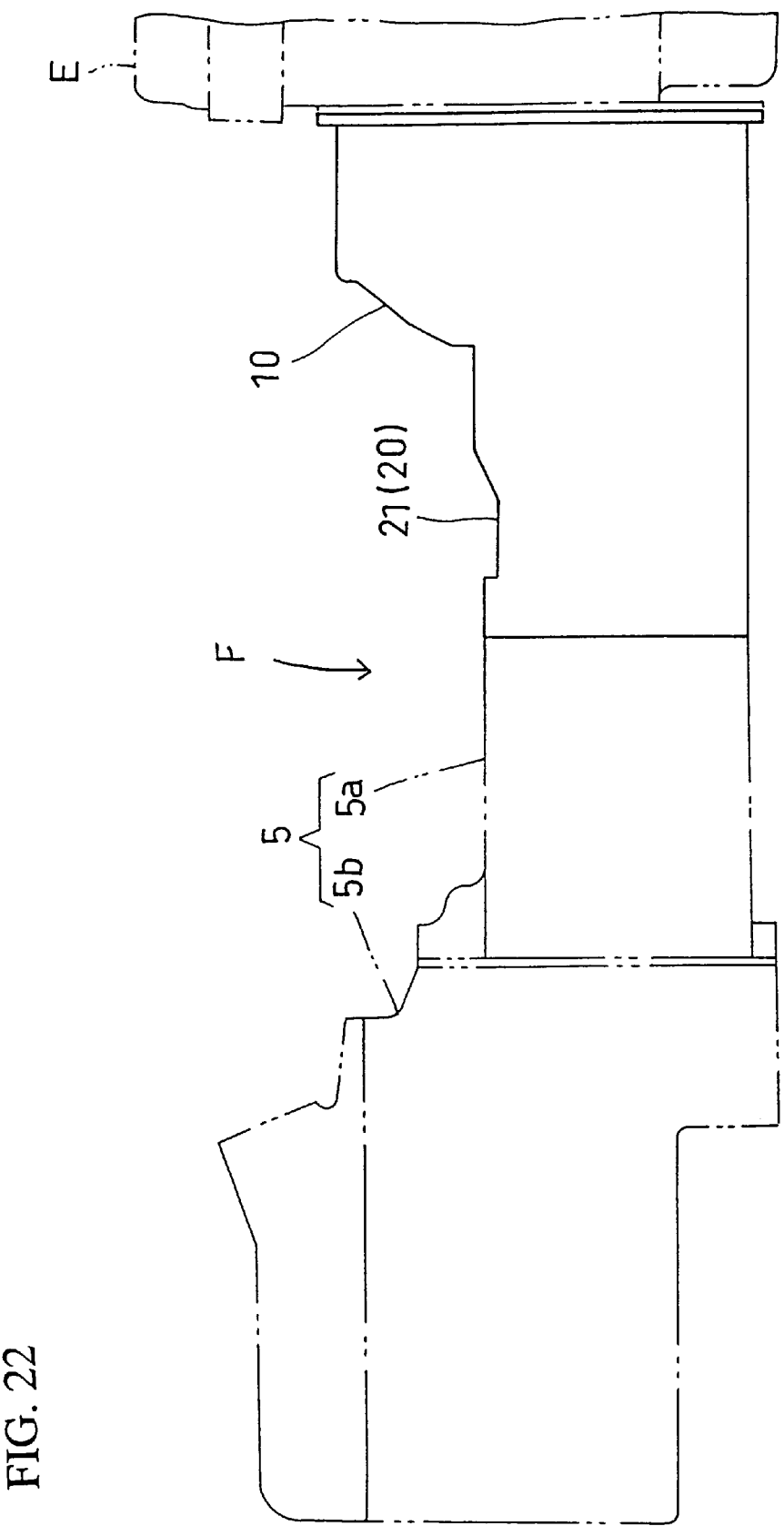
FIG. 22 is a side view corresponding to FIG. 2 and showing a modified body frame.

The body frame F may be constructed as shown in FIG. 22. In this modification, the HST case 21 of the stepless transmission 20 is formed simultaneously with the main clutch housing 10. Thus, the HST case 21 is formed integral with the main clutch housing 10.

[Other Embodiment]

FIGS. 17 through 21 show another embodiment of this invention. In this embodiment, the change speed pedal 71 pivotably supported on the driving deck 70 and the control lever 63 of stepless transmission 20 are connected to each other through an interlocking mechanism 110 which takes the place of the interlocking mechanism 73 of the preceding embodiment. Further, the stepless transmission 20 may be locked to a set speed by a cruising device different from what is used in the preceding embodiment.

Figure 17:
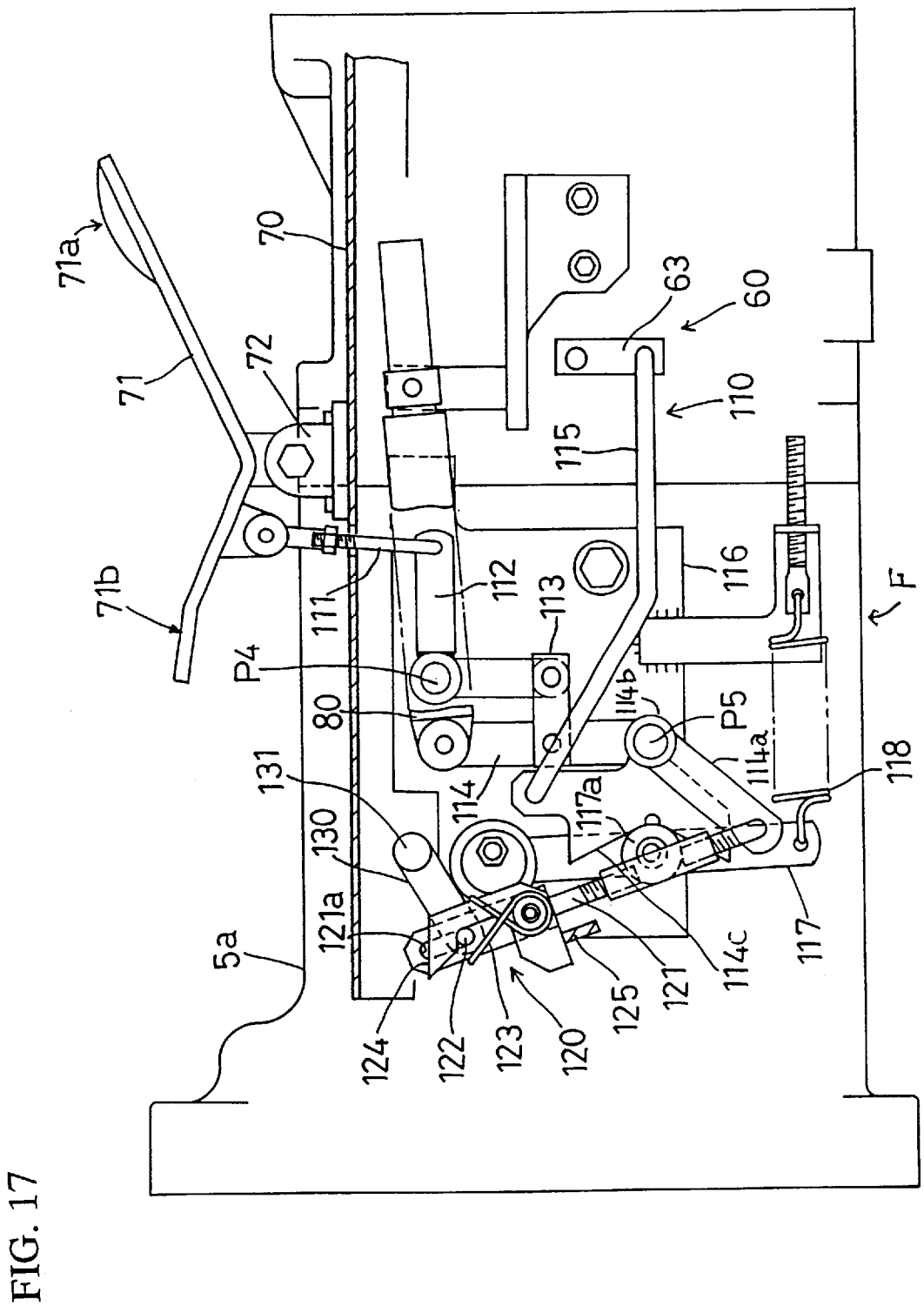
FIG. 17 is a side view corresponding to FIG. 10 and showing an interlocking mechanism between a change speed pedal and a stepless transmission in another embodiment.
Figure 18:
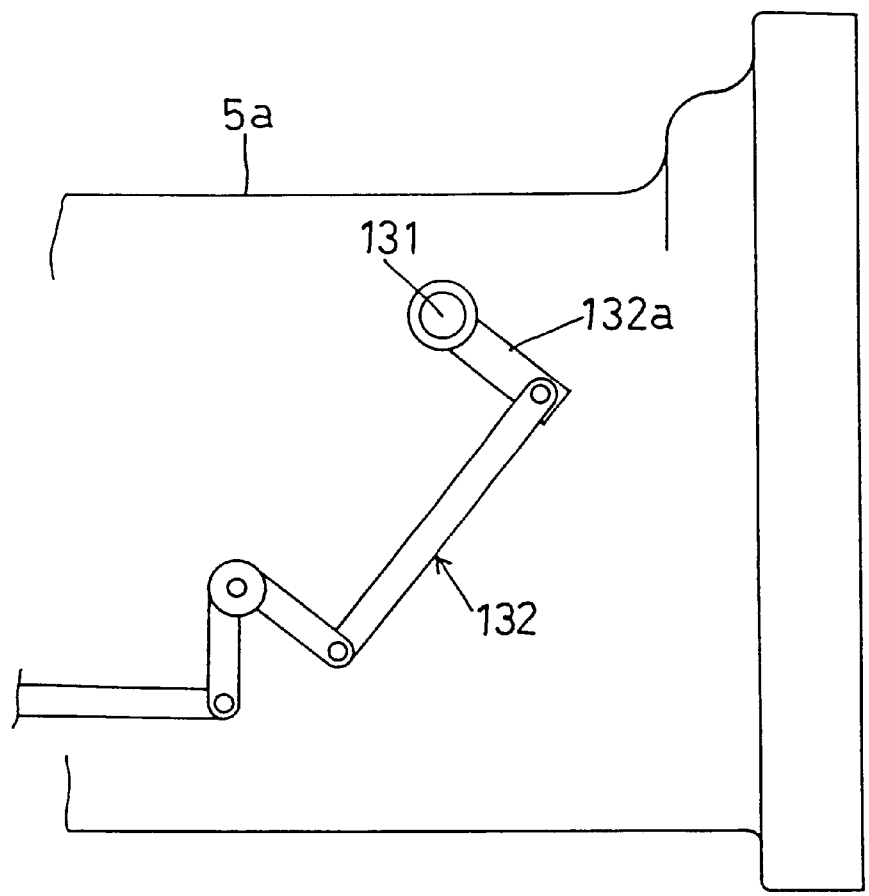
FIG. 18 is a side view of an interlocking mechanism between a speed retainer and a cruise lever.

As shown in FIG. 17, the interlocking mechanism 110 includes an interlocking rod 111 having one end thereof connected to the change speed pedal 71, a first pivotal link 112 connected to the other end of the interlocking rod 111 and supported by the body frame F to be pivotable about an axis P4, a push-pull link 113 having one end thereof connected to the first pivotal link 112, a second pivotal link 114 connected to the other end of the push-pull link 113 and supported by the body frame F to be pivotable about an axis P5, and an interlocking rod 115 connecting the second pivotal link 114 to the control lever 63 of servo valve 62 provided for the control unit 60 of stepless transmission 20.

A support member 116 is bolted to a side of body frame F. The first pivotal link 112 and second pivotal link 114 are connected to the support member 116 to be pivotable about the axes P4 and P5, thereby being pivotably supported by the body frame F. The second pivotal link 114 includes a link element 114a having a boss 114b connected to the support member 116 and a point of connection to the push-pull link 113, and a cam plate 114c connected to the boss 114b to be pivotable therewith and having a point of connection to the interlocking rod 115. A damper 80 similar to the damper 80 shown in FIG. 10 is connected between the link element 114a of second pivotal link 114 and the support member 116. The cam plate 114c of second pivotal link 114 has a cam follower 114c similar to the cam follower 74e shown in FIG. 10. A cam member 117 has a cam 117a in the form of a roller disposed in an intermediate position thereof for contacting the cam follower 114c. The cam member 117 has one end thereof pivotably supported by the support member 116, and the other end connected to the support member 116 through a spring 118. The spring 118 biases the cam member 117 toward the second pivotal link 114, whereby the cam 117a of second pivotal link 114 contacts the cam follower 114c. The cam member 117, with the cam 117a pressing against the cam follower 114c of second pivotal link 114, applies an operational resistance and a neutral restoring force to the change speed pedal 71 and control lever 63.

With the above construction, when the driver depresses the forward drive control end 71a of change speed pedal 71, this control force causes the control lever 63 of servo valve 62 to pivot forwardly. This switches the stepless transmission 20 from neutral to the forward drive position. When the driver further depresses the forward drive control end 71a, the stepless transmission 20 provides a higher forward speed. When the driver depresses the backward drive control end 71b of change speed pedal 71, this control force causes the control lever 63 to pivot rearwardly. This switches the stepless transmission 20 from neutral to the backward drive position. When the driver further depresses the backward drive control end 71b, the stepless transmission 20 provides a higher backward speed.

In the example shown in FIGS. 17 through 20, the second pivotal link 114 and a speed retainer 130 are interlocked through a cruise regulating mechanism 120. The speed retainer 130 is supported to be pivotable through a rotary support shaft 131 by an upper portion of the main transmission case body 5a.

An interlocking mechanism 132 is disposed at an end of the rotary support shaft 131 remote from the speed retainer 130. The interlocking mechanism 132 includes a pivotal link 132a connected to the end of the rotary support shaft 131 to be pivotable therewith, a plurality of other pivotal links, and interlocking rods interconnecting the pivotal links. A swing arm 133 is coupled to the above end through this interlocking mechanism 132. The swing arm 133 is pivotably supported by a vertical support shaft 135 extending through a bracket 134 supported by a steering column in the driving section. A cruise lever 136 is supported by the bracket 134 through the support shaft 135, to be pivotable about the same axis and relative to the swing arm 133. The cruise lever 136 has a stopper arm 136a extending from a proximal end to be pivotable therewith and to act on the swing arm 133. On opposite, upper and lower sides of a proximal portion of cruise lever 136 are friction elements 137 slidably fitted on the support shaft 135. A spring case 138 also is slidably fitted on the support shaft 135. This spring case 138 contains a lever retaining spring 139 which, combined with the friction elements 137, forms a cruise lever retaining mechanism 140 for retaining the cruise lever 136 in a selected position from neutral position N to a maximum forward speed position Fmax. That is, the lever retaining spring 139 acts to press the cruise lever 136 against a lever support 134a of the bracket 134 through the spring case 138 and friction elements 137. A frictional force produced at this time retains the cruise lever 136 in a selected position against the neutral restoring force of the cam member 117.

As shown in FIG. 17, the cruise regulating mechanism 120 includes an interlocking rod 121 having one end thereof pivotally connected to the second pivotal link 114 and the other end defining a slot 121a, a connecting pin 122 connected to the speed retainer 130 and having a distal end thereof slidably fitted in the slot 121a, a hook 124 pivotably supported by the interlocking rod 121 adjacent the slot 121a to couple the connecting pin 122 and interlocking rod 121, a hook spring 123 for biasing the hook 124 to a position for engaging the connecting pin 122, and a hook actuator 125 supported by a support member 116 to act on a proximal end of hook 124.

FIGS. 21(a) and (b) show operations of the cruise regulating mechanism 120. When the control lever 63 is in the forward drive position, as shown in FIG. 21(a), the interlocking rod 121 moves toward the speed retainer 130 relative to the hook actuator 125, whereby the hook actuator 125 departs from the proximal end of hook 124 to stop pressing the same. As a result, the hook 124, under the biasing force of hook spring 123, engages the connecting pin 122 to couple the connecting pin 122 to the interlocking rod 121. With the connection between the connecting pin 122 and interlocking rod 121, the interlocking rod 121 is linked with the speed retainer 130. As a result, a linkage is established from the swing arm 133 to the control lever 63. The action of the stopper arm 136a of cruise lever 136 to stop the swing arm 133 reaches the control lever 63.

On the other hand, when the control lever 63 in the backward drive position, as shown in FIG. 21(b), the interlocking rod 121 moves away from the speed retainer 130 relative to the hook actuator 125, whereby the hook actuator 125 presses the proximal end of hook 124. As a result, the hook 124 is disengaged from the connected pin 122 against the biasing force of hook spring 123 to uncouple the connecting pin 122 from the interlocking rod 121. Consequently, the above linkage between the interlocking rod 121 and speed retainer 130 is canceled, and so is the linkage between the swing arm 133 and control lever 63. The action of the stopper arm 136a of cruise lever 136 to stop the swing arm 133 does not reach the control lever 63.

Figure 19:
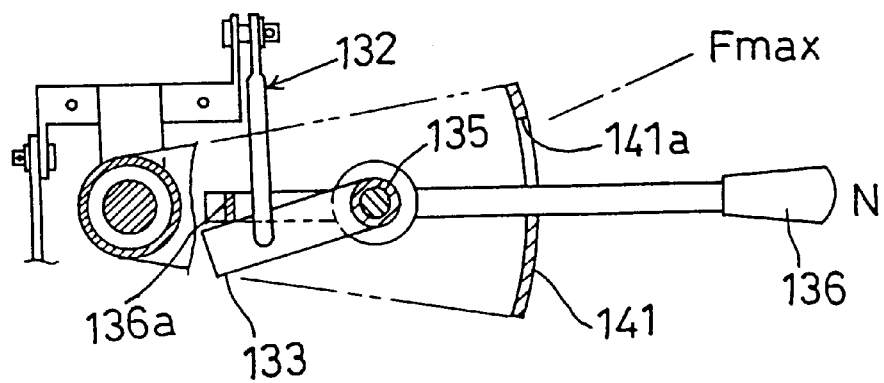
FIG. 19 is an explanatory view showing control positions of the cruise lever.

In this cruising device, as shown in FIG. 19, the cruise lever 136 is pivotable about the axis of support shaft 135 along a guide groove 141a of a lever guide 141 to set a forward speed. The stepless transmission 20 is locked to the set forward speed. The cruising device locks the stepless transmission 20 only to a selected forward speed. As for backward drive, the cruise regulating mechanism 120 allows the stepless transmission 20 to be controlled freely by the change speed pedal 71 while the cruise lever 136 is set to neutral position N. An operation of the cruise regulating mechanism 120 for suppressing the cruising action for backward drive will be described hereinafter.

When the driver rocks the cruise lever 136 from neutral position N to maximum forward speed position Fmax against the frictional force of the cruise lever retaining mechanism 140, the stopper arm 136*a* of cruise lever 136 contacts the swing arm 133 and swings the swing arm 133 about the axis of support shaft 135. Consequently, the swing arm 133, through the interlocking mechanism 132 and rotary support shaft 131, causes the speed retainer 130 at the other end of support shaft 131 to pivot upward. Then, the speed retainer 130, through the cruise regulating mechanism 120, second pivotal link 114 and interlocking rod 115, causes the control lever 63 of servo valve 62 to pivot to the forward drive position. The driver stops the cruise lever 136 at a desired position. Then, the cruise lever 136 is retained in that position by the cruise lever retaining mechanism 140. The stopper arm 136*a* acts to stop the swing arm 133. The swing arm 133, through the link mechanism 132 and rotary support shaft 131, holds the speed retainer 130 in a position corresponding to the position of the cruise lever 136, against the neutral restoring force of cam member 117. As a result, the speed retainer 130, through the cruise regulating mechanism 120, second pivotal link 114 and interlocking rod 115, retains the control lever 63 in a forward speed position corresponding to the position of the cruise lever 136 against the neutral restoring force of cam member 117. During a forward run, the swing arm 133 is swung away from the stopper arm 136 by depressing the forward drive control end 71*a* of change speed pedal 71, whereby the control lever 63 pivots to a higher speed position. Thus, the driver can control the stepless transmission 20 for a higher speed than the speed set by the cruise lever 136. When, in this state, the driver releases the change speed pedal 71, the stepless transmission 20, under the restoring force of cam member 117, automatically decelerates to the forward speed set by the cruise lever 136.

During a backward run, on the other hand, the driver depresses the backward drive control end 71*b* of change speed pedal 71 after setting the cruise lever 136 to neutral position N. Then, the cruise regulating mechanism 120 cancels the connection between the second interlocking link 114 and speed retainer 130. Consequently, the stopping action of the stopper arm 136*a* of cruise lever 136 does not reach the second pivotal link 114. Although the cruise lever 136 is set to neutral position N, the driver can swing the control lever 63 to the backward position to control the stepless transmission 20 for varying backward speeds.

Figure 20:
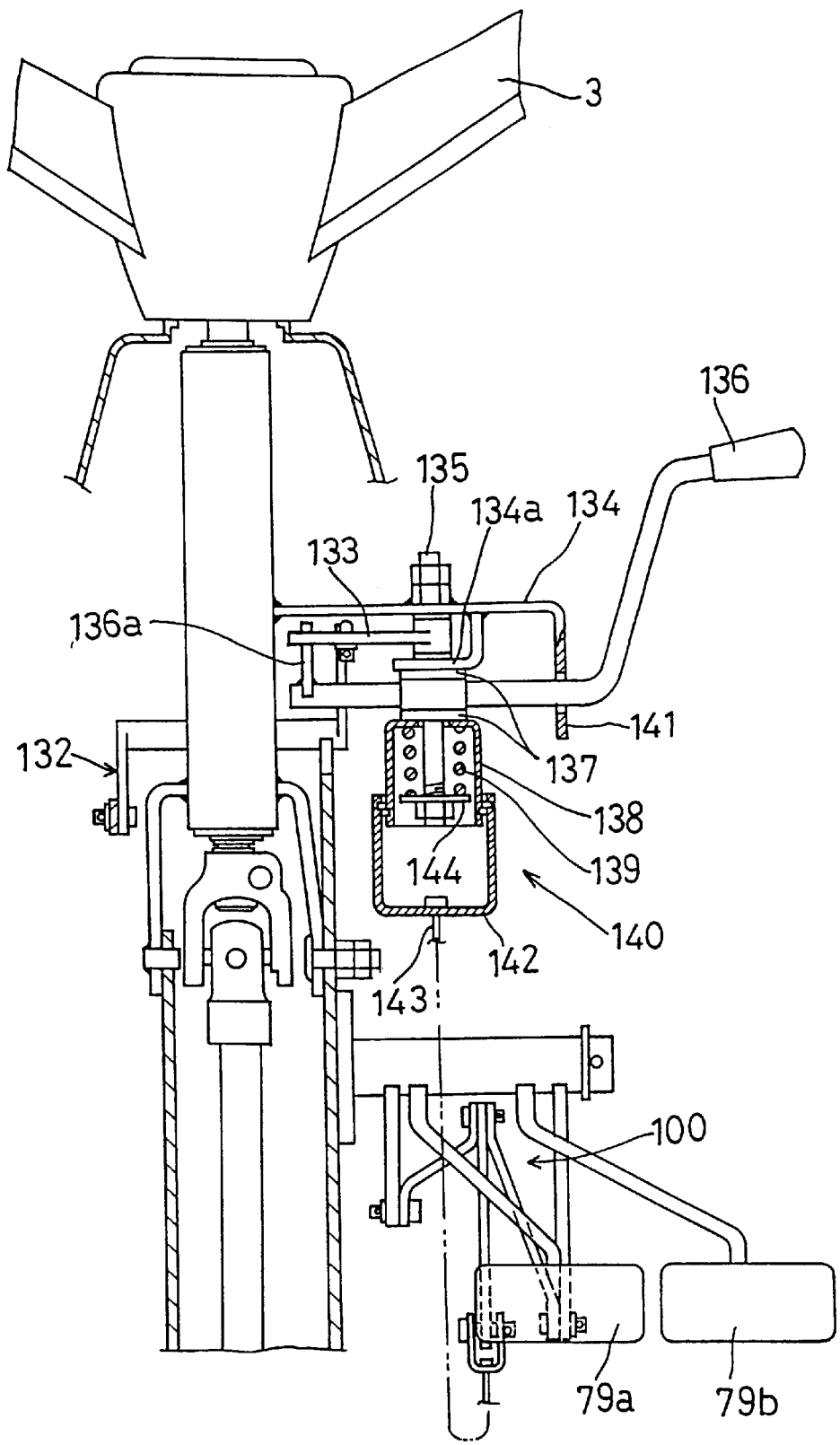
FIG. 20 is a sectional view of the cruise lever.
Figure 21:
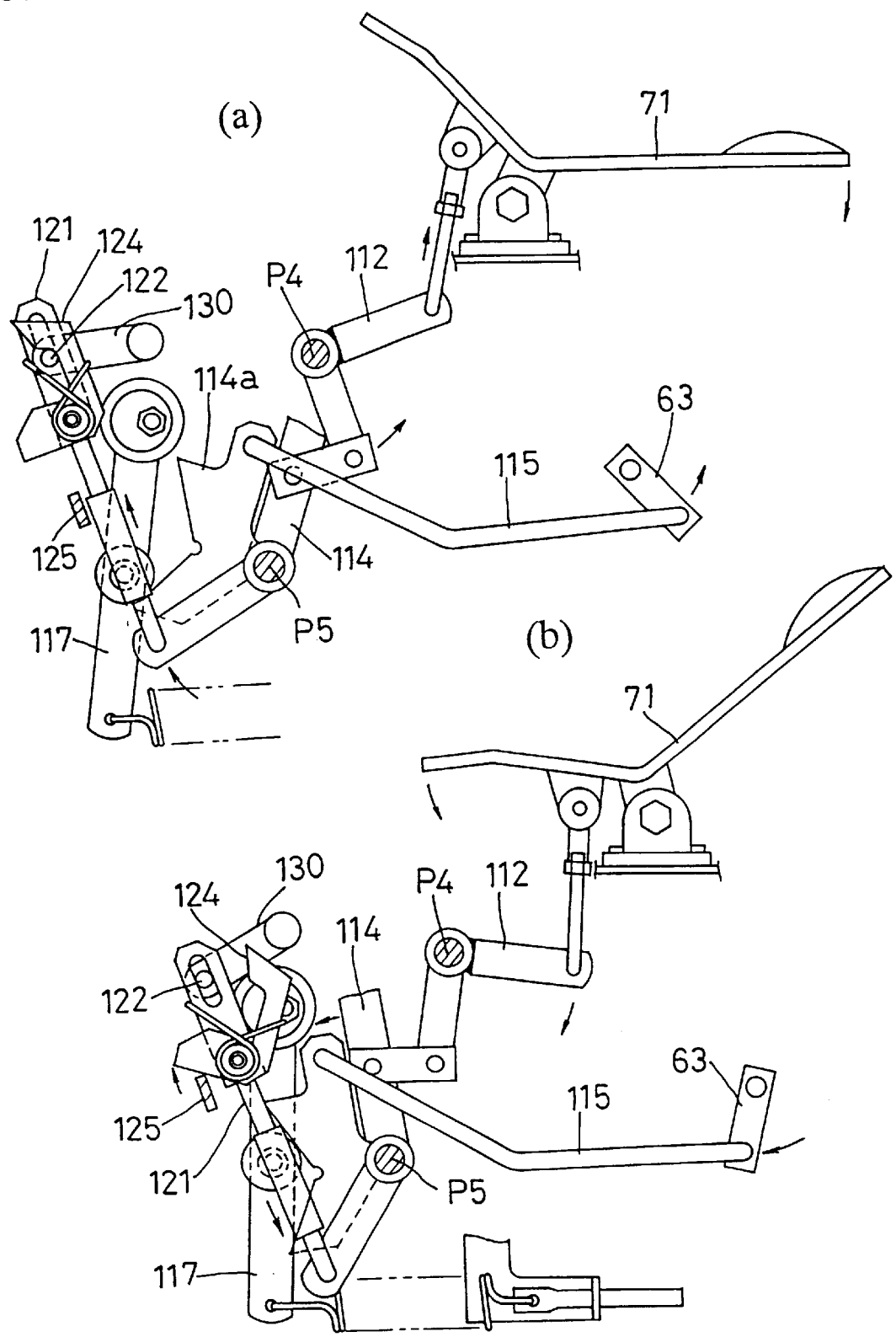
FIG. 21 is an explanatory view of operation of a cruise regulating mechanism.

As shown in FIG. 20, a cruise release device 142 is attached to the spring case 138. This cruise release device 142 is connected to the right and left brake pedals 79*a* and 79*b* through a control cable 143 and an interlock regulating mechanism 100 similar to that shown in FIG. 13. With this construction, when the driver depresses both the right and left brake pedals 79*a* and 79*b*, the control cable 143 is pulled by the interlocking mechanism 100. Under the tension of the cable 143, the cruise release device 142 pulls the spring case 138 away from the lever support 134*a* of bracket 134. As a result, the lever retaining spring 139 is compressed toward a spring bearing 144 to release the cruise lever 136 from the frictional retention by the cruise lever retaining mechanism 140. That is, by braking both the right and left rear wheels 2, the stepless transmission 20 is freed from a speed set by the cruise lever 136, thereby allowing the vehicle to stop. When only one of the right and left brake pedals 79*a* and 79*b* is depressed, the control cable 143 is not pulled by the interlocking mechanism 100. Thus, the cruise release device 142 does not compress the lever retaining spring 139. The cruise lever retaining mechanism 140 frictionally retains the cruise lever 136 in a selected position. Thus, when the driver brakes only one of the right and left rear wheels 2, the stepless transmission 20 remains locked to a speed set by the cruise lever 136. The vehicle can make a small turn while driving an outer one of the rear wheels at a fixed speed.

What is claimed is:

1. A working vehicle comprising:
   an engine disposed adjacent one end in a fore and aft direction of a vehicle body;
   a propelling transmission case disposed adjacent the other end in said fore and aft direction of said vehicle body; and
   a hydraulic stepless transmission case disposed between said engine and said propelling transmission case;
   said hydraulic stepless transmission case housing a hydraulic stepless transmission having a hydraulic pump and a hydraulic motor for changing speed of engine output, and transmitting the engine output to a propelling transmission in said propelling transmission case;
   said hydraulic stepless transmission case defining an oil chamber accommodating said hydraulic pump and said hydraulic motor, wherein said hydraulic stepless transmission case includes a wall disposed adjacent said propelling transmission case and extending transversely of said vehicle body, said wall mounting respective shafts of said hydraulic pump and said hydraulic motor, said shafts positioned side by side with each other, and said wall defining an oil line communicating with said hydraulic pump and said hydraulic motor, and
   wherein said engine, said propelling transmission case and said hydraulic stepless transmission case constitute a body frame.

2. A working vehicle as defined in claim 1, further comprising a main clutch housing for accommodating a main clutch for coupling said engine and said hydraulic stepless transmission, wherein said hydraulic stepless transmission case is connected between said main clutch housing and said propelling transmission case.

3. A working vehicle as defined in claim 2, wherein said propelling transmission case accommodates an implement driving transmission for changing power from said engine, and transmitting the power to a power take off shaft, and wherein a power branching mechanism is disposed between said main clutch and said hydraulic stepless transmission for dividing the power from said engine to said propelling transmission and said implement driving transmission.

4. A working vehicle as defined in claim 2, wherein said hydraulic stepless transmission is disposed adjacent and rearwardly of said main clutch, said hydraulic stepless transmission being operable by a change speed pedal disposed in a position above said hydraulic stepless transmission and where said hydraulic stepless transmission and said change speed pedal overlap each other in plan view.

5. A working vehicle as defined in claim 4, wherein said change speed pedal is pivotably supported on a driving deck.

6. A working vehicle as defined in claim 4, wherein said change speed pedal is operatively connected to said hydraulic stepless transmission through an interlocking mechanism.

7. A working vehicle as defined in claim 1, further comprising control means disposed on a side surface of said hydraulic stepless transmission case for varying a swash plate angle of said hydraulic pump.

8. A working vehicle as defined in claim 1, wherein said hydraulic pump has an intake port and a drain port arranged in a direction relative to said vehicle body different from a direction of arrangement of an intake port and a drain port of said hydraulic motor.

9. A working vehicle comprising:
an engine disposed adjacent one end in a fore and aft direction of a vehicle body;
a propelling transmission case disposed adjacent the other end in a fore and aft direction of said vehicle body;
an hydraulic stepless transmission case disposed between said engine and said propelling transmission case;
said hydraulic stepless transmission case housing a hydraulic stepless transmission having a hydraulic pump and a hydraulic motor for changing speed of engine output to a propelling transmission within said propelling transmission case, wherein respective shafts of said hydraulic pump and said hydraulic motor are arranged substantially transversely of a longitudinal axis of said vehicle body within said hydraulic stepless transmission case;
a change speed pedal for controlling said hydraulic stepless transmission;
a driving deck for pivotably supporting said change speed pedal;
swash plate control means interlocked to said change speed pedal for varying a swash plate angle of said hydraulic pump, said swash plate control means including a servo cylinder and a servo valve disposed on a lateral side of said hydraulic stepless transmission case and extending in a vertical direction of said vehicle body; and
an interlocking mechanism for operatively connecting said change speed pedal and said swash plate control means, said interlocking mechanism including a vertical rod extending substantially in a vertical direction of said vehicle body from said change speed pedal through said driving deck, and a horizontal rod extending from said vertical rod to said swash plate control means substantially in said fore and aft direction of said vehicle body for interconnecting said interlocking mechanism and said swash plate control means.

10. A working vehicle as defined in claim 9, further comprising a main clutch housing for accommodating a main clutch for coupling said engine and said hydraulic stepless transmission, wherein said hydraulic stepless transmission case is connected between said main clutch housing and said propelling transmission case.

11. A working vehicle as defined in claim 10, wherein said propelling transmission case accommodates an implement driving transmission for changing power from said engine, and transmitting the power to a power takeoff shaft, and wherein a power branching mechanism is disposed between said main clutch and said hydraulic stepless transmission for dividing the power from said engine to said propelling transmission and said implement driving transmission.

12. A working vehicle as defined in claim 10, wherein said hydraulic stepless transmission is disposed adjacent and rearwardly of said main clutch, said hydraulic stepless transmission being operable by said change speed pedal disposed in a position above said hydraulic stepless transmission and where said hydraulic stepless transmission and said change speed pedal overlap each other in plan view.

13. A working vehicle as defined in claim 9, wherein said hydraulic pump has an intake port and a drain port arranged in a direction relative to said vehicle body different from a direction of arrangement of an intake port and a drain port of said hydraulic motor.

* * * * *